(12) United States Patent
Choi et al.

(10) Patent No.: US 11,384,435 B2
(45) Date of Patent: *Jul. 12, 2022

(54) WET-COATING OF THIN FILM LITHIUM NICKEL OXIDES FOR ELECTROCHROMIC APPLICATIONS

(71) Applicant: Kinestral Technologies, Inc., Hayward, CA (US)

(72) Inventors: Hye Jin Choi, Berkeley, CA (US); John David Bass, San Francisco, CA (US); Eric Lachman, San Ramon, CA (US); Daniel Mark Giaquinta, Saratoga, CA (US); Howard W. Turner, Campbell, CA (US); Ellen Murphy, San Francisco, CA (US)

(73) Assignee: HALIO, INC., Hayward, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/889,505

(22) Filed: Jun. 1, 2020

(65) Prior Publication Data

US 2020/0301231 A1    Sep. 24, 2020

Related U.S. Application Data

(62) Division of application No. 14/806,543, filed on Jul. 22, 2015, now Pat. No. 10,670,936.

(60) Provisional application No. 62/028,257, filed on Jul. 23, 2014.

(51) Int. Cl.
  *C23C 18/12*  (2006.01)
  *G02F 1/1524*  (2019.01)
  *G02F 1/1523*  (2019.01)
  *G02F 1/153*  (2006.01)
  *B05D 1/00*  (2006.01)
  *B05D 3/04*  (2006.01)

(52) U.S. Cl.
  CPC .......... *C23C 18/1216* (2013.01); *B05D 1/005* (2013.01); *B05D 3/0486* (2013.01); *C23C 18/1275* (2013.01); *C23C 18/1279* (2013.01); *G02F 1/153* (2013.01); *G02F 1/1523* (2013.01); *G02F 1/1524* (2019.01)

(58) Field of Classification Search
  CPC ............................ C23C 18/1216; G02F 1/153
  See application file for complete search history.

(56) References Cited

U.S. PATENT DOCUMENTS 10,670,936 B2 *   6/2020   Choi .................. C23C 18/1275

\* cited by examiner

*Primary Examiner* — Tabassom Tadayyon Eslami
(74) *Attorney, Agent, or Firm* — Womble Bond Dickinson (US) LLP

(57) ABSTRACT

Process for forming a multi-layer electrochromic structure, the process comprising depositing a film of a liquid mixture onto a surface of a substrate, and treating the deposited film to form an anodic electrochromic layer, the liquid mixture comprising a continuous phase and a dispersed phase, the dispersed phase comprising metal oxide particles, metal hydroxide particles, metal alkoxide particles, metal alkoxide oligomers, gels or particles, or a combination thereof having a number average size of at least 5 nm.

24 Claims, 1 Drawing Sheet

WET-COATING OF THIN FILM LITHIUM NICKEL OXIDES FOR ELECTROCHROMIC APPLICATIONS

The present disclosure generally relates to liquid compositions comprising lithium nickel oxides, methods for preparing lithium nickel oxide compositions adapted for thin film deposition onto a substrate for the formation of switchable electrochromic multi-layer devices, and methods for preparing multi-layer structures comprising such films.

Commercial switchable glazing devices, also commonly known as smart windows and electrochromic window devices, are well known for use as mirrors in motor vehicles, aircraft window assemblies, sunroofs, skylights, and architectural windows. Such devices may comprise, for example, active inorganic electrochromic layers, organic electrochromic layers, inorganic ion-conducting layers, organic ion-conducting layers and hybrids of these sandwiched between two conducting layers. When a voltage is applied across these conducting layers the optical properties of a layer or layers in between change. Such optical property changes typically include a modulation of the transmissivity of the visible or the solar sub-portion of the electromagnetic spectrum. For convenience, the two optical states will be referred to as a bleached state and a darkened state in the present disclosure, but it should be understood that these are merely examples and relative terms (i.e., a first one of the two states is more transmissive or "more bleached" than the other state and the other of the two states is less transmissive or "more darkened" than the first state) and that there could be a set of bleached and darkened states between the most transmissive state and the least transmissive state that are attainable for a specific electrochromic device; for example, it is feasible to switch between intermediate bleached and darkened states in such a set.

The broad adoption of electrochromic window devices in the construction and automotive industries will require a ready supply of low cost, aesthetically appealing, durable products in large area formats. Electrochromic window devices based on metal oxides represent the most promising technology for these needs. Typically, such devices comprise two electrochromic materials (a cathode and an anode) separated by an ion-conducting film and sandwiched between two transparent conducting oxide (TCO) layers. In operation, a voltage is applied across the device that causes current to flow in the external circuit, oxidation and reduction of the electrode materials and, to maintain charge balance, mobile cations to enter or leave the electrodes. This facile electrochemical process causes the window to reversibly change from a more bleached (e.g., a relatively greater optical transmissivity) to a more darkened state (e.g., a relatively lesser optical transmissivity).

For long-term operation of an electrochromic window, the components within the device must be well matched; e.g., the electrochemical potentials of the electrodes over their states of charge should be within the voltage stability window of the ion conductor and of the TCO material. If not, electron transfer will occur between the electrode materials and the other window components causing, for example, leakage current, electrolyte consumption, buildup up of reaction products on the electrode(s) and, in general, significantly shortening the useful lifespan of the window.

TCO materials typically used in electrochromic windows such as FTO and ITO react with lithium at voltages below ~1V vs. $Li/Li^+$, lowering their electrical performance and darkening the material. Electrolytes typically incorporated into the ion conductor, or the presence of water or protic impurities, have voltage stability windows between ~1 and ~4.5 V vs. $Li/Li^+$. Therefore, it is beneficial to use electrode materials that undergo redox events within these limits. For example, tungsten oxide ($WO_3$) is a well-known cathodic electrochromic material that is bleached at ~3.2 V vs. $Li/Li^+$ and darkens upon reduction, typically to ~2.3 V vs. $Li/Li^+$. Consequently, electrochromic devices comprising a tungsten oxide cathode are common.

Certain nickel oxide and hydroxide based materials darken anodically to produce a darkened state transmission spectrum that is complementary to lithiated $WO_3$ and it is a popular target to partner $WO_3$ in electrochromic windows. Certain methods for the preparation of lithium nickel oxide films ($LiNiO_x$) have been reported in the literature. These include sputter methods (see, e.g., Rubin et. al. Solar Energy Materials and Solar Cells 54; 998 59-66) and solution methods (see, e.g., Svegl et. al., Solar Energy V 68, 6, 523-540, 2000). In both cases the films exhibit high area charge capacity (>20 $mC/cm^2$), with bleached state voltages of ~1-1.5V. This bleached state voltage is relatively close to the reaction potential of lithium with typical TCO materials, the lower voltage limit of common electrolytes and the reaction potential required to over-reduce lithiated nickel oxides to nickel metal, a cathodic electrochromic reaction. The proximity of the bleached state voltage to such degrading mechanisms presents significant device control issues: methods will be required to consistently drive the device to the bleached state without driving the anode into damaging voltage regimes accommodating, for example, issues such as local electrode inhomogeneity. Furthermore, the bleached state lithiated nickel oxide cannot typically be handled in air without the material performance degrading. For example, U.S. Pat. No. 6,859,297 B2 describes the lithiation (and bleaching) of nickel oxide films that required handling in a controlled atmosphere to preclude their exposure to water and oxygen.

A wide variety of film deposition processes have been described for producing metal oxide anode and cathode materials for electrochromic devices including vapor deposition (e.g., sputtering, CVD) and wet chemical methods (dip coating, spin coating). Each of these methods requires optimization of the film composition and film deposition processing so that high quality films (e.g., crack-free, uniform films on large area substrates having strong adhesion and electrical contact with the transparent conducting and ion-conducting interfaces) are created in "Electrochemically and Optically Matched" states (EOM). In general, cathode and anode films are in an EOM state when their charge capacities are similar, they are in their complementary optical states (e.g., both in their clear states) and electrochemical states (e.g., one reduced the other oxidized) and one film colors cathodically while the other film colors anodically.

Regarding wet chemical deposition processes, solution-based methods are widely used for the synthesis of inorganic materials. Under certain conditions, wet chemical processes can be particularly optimized for the preparation of thin films on various substrates. Depending on the application, different types of liquid deposition techniques, for example, dip-coating, spin coating or the like, may necessitate different solution optimizations even for the same target compositions. Liquid mixtures such as those utilized in sol-gel processes are particularly interesting because of the breadth of chemical modifications that are possible.

Sol-gel processing, initially for the preparation of silica, has been known generally since the 1930s although gelation phenomena were observed upon the exposure of $SiCl_4$ in alcohol to ambient atmosphere since the mid-19th century. Development continued, exploding around the 1980s. Sol-gel processing, in a variety of forms, is commonly used for the preparation of bulk powders, films, fibers, or monoliths. Although the majority of research and technical reports remain concentrated in the examination of a small group of metals (e.g., Si, Al, Ti, V and several others), broad use is extremely common especially in academic groups.

Attractive features of the methodology include the use of liquid precursors to facilitate homogenous mixing. These materials are easily modified using conventional chemical syntheses and methods. Solution viscosities are easily optimized and reaction temperatures are often reduced as compared to conventional preparative techniques.

Broadly, the sol-gel process involves the formation of a hydroxy and/or oxo network through hydroxylation and condensation reactions of a molecular precursor, often a metal alkoxide. A sol is a stable dispersion of large molecules or small particles. A gel is a 3-D network that captures a liquid phase (solvent). Depending on the final product form, different methods are known, for example, to remove solvent, decompose additives, draw fibers, cast films and/or generate particles. Both aqueous and non-aqueous routes are well known. Certain molecular complexes are favored for certain purposes but should not be viewed as limiting in a general sense. Additives specific to certain chemistries are common, as are additives specific to the form of the final product—these also are not limiting. As an example, anti-cracking agents that are common for the preparation of a film may be unnecessary if the final product is a powder.

Although a wide variety of precursors for sol-gel processes exist, metal alkoxides are probably the most popular. One reason for their popularity is that alkoxides react readily with water. This reaction is called hydrolysis because a hydroxyl ion becomes attached to the metal center (M) as shown in the following reaction:

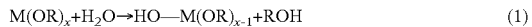
$$M(OR)_x + H_2O \rightarrow HO-M(OR)_{x-1} + ROH \quad (1)$$

In this reaction, the R can represent a proton or another ligand (for example if R is an alkyl group, then •OR is an alkoxy group and ROH is an alcohol). Depending on the quantity of water added and whether a catalyst is present, hydrolysis may go to completion, i.e. all of the OR groups are replaced by OH, e.g. $M(OH)_x$ as shown in reaction (2):

$$M(OR)_x + xH_2O \rightarrow M(OH)_x + xROH \quad (2)$$

Alternatively, if hydrolysis does not proceed to completion, the metal (M) is only partially hydrolyzed, e.g. $M(OR)_{x-y}(OH)_y$. Two partially hydrolyzed metals can react together in a condensation reaction as shown in reactions (3) and (4):

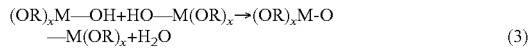
$$(OR)_xM-OH+HO-M(OR)_x \rightarrow (OR)_xM-O-M(OR)_x + H_2O \quad (3)$$

or

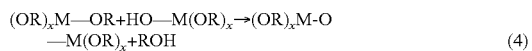
$$(OR)_xM-OR+HO-M(OR)_x \rightarrow (OR)_xM-O-M(OR)_x + ROH \quad (4)$$

Thus, by definition, condensation reactions will liberate either water or alcohol. In this regard, the reactions can be self-propagating to a certain extent. Under certain conditions, however, condensation may be limited. For example, if the metal complex $M(OR)_x$ is modified to $ML(OR)_{x-1}$, where L is an unreactive ligand, fewer condensation reactions will be possible per metal center. The nature of this chemistry is highly complex and is described in more detail in *Sol-Gel Science: The Physics and Chemistry of Sol-Gel Processing*, by C. Jeffrey Brinker and George W. Scherer.

Many crystal lattices may be described using the idea of close packing of spheres. Assuming that these spheres represent anions, a wide range of structures derive from metal (cation) occupation of the octahedral and tetrahedral sites within close packed anion arrays. In such arrays, there are equal numbers of octahedral sites as anions and twice as many tetrahedral sites as anions. The term "rock salt" as used herein describes a cubic structure in which metal cations ("M") occupy all of the octahedral sites within a close packed anion array, resulting in the stoichiometry MO. Furthermore, the metals are indistinguishable from one another regardless of whether the metals are the same element or a random distribution of different elements. In the specific case of NiO, for example, the cubic rock salt unit cell is ~4.2 Å on a side and by X-ray diffraction, the largest d-spacing is ~2.4 Å. In the case where there is more than one type of metal, different analogues of the rock salt parent structure may be created depending upon how and if the metals order themselves over the octahedral and tetrahedral sites. The case of $Li_xNi_{1-x}O$ is instructive: for all values of x, the oxygen anions are close packed and the metals are arranged on the octahedral sites. For values of x less than ~0.3, the lithium and nickel cations are randomly arranged; for values of x greater than 0.3, the metals segregate to create nickel-rich and lithium-rich layers, resulting in a layered structure and a reduction to hexagonal symmetry from cubic. The end member, $Li_{1/2}Ni_{1/2}O$ (equivalently, $LiNiO_2$) is formed from alternate layers of —Ni—O—Li—O— with a hexagonal unit cell (a=2.9 Å; c=14.2 Å) and a largest d-spacing of ~4.7 Å. The voltage associated with the lithium intercalation events in $LiNiO_2$ is above 3V vs. Li/Li+.

Even though all of the octahedral sites in $LiNiO_2$ are occupied, additional lithium can be inserted into the material, forming $Li_{1+x}NiO_2$. The additional lithium necessarily occupies sites in close proximity to other cations with less shielding from the anion array. Thus, the insertion of this additional lithium occurs at lower voltages, <2V vs. Li/Li+ for bulk phase materials.

Other phases that are possible from metal occupation of sites within close-packed oxygen arrays include the orthorhombic phases $Li_{1/2}Ni_{1/3}Ta_{1/6}O$ and $Li_{1/2}Ni_{1/3}Nb_{1/6}O$ in which the Nb or Ta segregate to one set of octahedral sites and the Ni and Li are mixed on the remaining sites. Further examples are the spinel phases including $Li_{1/4}Mn_{3/8}Ni_{1/8}O$ in which Mn and Ni occupy the octahedral sites and Li occupies ¼ of the tetrahedral sites.

A collective signature of all of the phases described above are the close packed layers. In the rock salt structure, these give rise to a single diffraction reflection at ~2.4 Å, labeled as the (111) reflection. This is the largest symmetry allowed d-spacing in the rock salt structure. The second largest d-spacing allowed in the rock salt structure is the (200) peak whose d-spacing is ~2.1 Å. In lower symmetry structures such as $Li_{1/2}Ni_{1/2}O$ and $Li_{1/2}Ni_{1/3}Ta_{1/6}O$, reflections equivalent to the rock salt (111) and (200) reflections are observed at approximately the same d-spacing but are labeled differently and may be split into multiple peaks. For example, in the hexagonal, layered material the rock salt (111) reflection splits into two reflections, the (006) and the (102) peak, both of which occur at ~2.4 Å and the rock salt (200) peak becomes the (104) peak, whose d-spacing is also 2.1 Å. A clear signature that an ordered metal sub-lattice exists within a material giving rise to structures such as $Li_{1/2}Ni_{1/2}O$, $Li_{1/2}Ni_{1/3}Nb_{1/6}O$, and $Li_{1/4}Mn_{3/8}Ni_{1/8}O$ is the presence of reflections with d-spacings greater than 2.4 Å (Table 1).

TABLE 1

Largest d-spacing (Å) and associated hkl of example materials derived from metals within octahedral and/or tetrahedral sites created by close packed oxygen arrays

| Composition | Structure Note | Largest d-spacing (Å) | hkl |
|---|---|---|---|
| NiO | rock salt | 2.4 | (111) |
| $Li_{0.1}Ni_{0.9}O$ | rock salt, Li and Ni randomly arranged | 2.4 | (111) |
| $Li_{1/2}Ni_{1/2}O$ | Hexagonal, Li and Ni ordered into layers | 4.7 | (003) |
| $Li_{1/2}Ni_{1/3}Ta_{1/6}O$ | Orthorhombic, Ta and Li/Ni ordered | 4.7 | (111) |
| $Li_{1/4}Mn_{3/8}Ni_{1/8}O$ | Cubic, Ni/Mn in octahedral sites; Li in tetrahedral sites | 4.7 | (111) |

Although a range of electrochromic anodic materials have been proposed date, there is a need for anode films that can be prepared by simple single-step deposition processes to produce EC anodes with improved thermal stability, high optical clarity in their as-deposited states, and that can be tuned via composition and film thickness to adopt a wide variety of area charge capacities and optical switching properties.

Among the various aspects of the present disclosure is the provision of a process for the preparation of liquid mixtures adapted for thin film deposition onto a substrate. The liquid mixture contains a liquid phase (also known as a continuous phase) and a dispersed phase that may include anything from discrete particles to a semi-continuous polymer network. If the dispersed phase is a dissolved phase where the dissolved species (e.g. molecules or molecular complexes) are commonly sized on the order of 1 nm, the liquid mixture may be considered to be a solution. If the dispersed phase is sized between 1 nm and 1 micrometer, the dispersed phase may be considered to be a colloidal dispersion according to commonly accepted definitions. If the dispersed phase is sized greater than 1 micrometer, the dispersed phase may be considered to be a coarse dispersion. Sometimes a coarse dispersion may be called a suspension. According to commonly accepted definitions, a suspension may be further defined as containing particles that are sufficiently large for sedimentation and will settle over time if undisturbed. According to the provisions of the present disclosure, when preparing liquid mixtures adapted for thin film deposition onto a substrate, there is benefit if the liquid mixture is comprised of a dispersed phase that does not rapidly precipitate. For example, in some embodiments, the liquid mixture is a colloidal dispersion of discrete particles in a continuous, liquid phase. In other embodiments, the liquid mixture comprises an integrated network (or gel) of either discrete particles or oligomers. In yet other embodiments, the volume fraction of particles (or particle density) in the liquid mixture may be so low that a significant amount of fluid from the liquid mixture may need to be removed for gel-like properties to be recognized. In yet another embodiment, the liquid mixture comprises discrete pre-formed particles that have been dispersed in a liquid phase.

One aspect of the present disclosure is a process for forming a multi-layer electrochromic structure. The process comprises forming a liquid mixture comprising a liquid phase and a dispersed phase, depositing a film of a liquid mixture comprising lithium, nickel, and at least one bleached state stabilizing element onto a surface of a substrate, and treating the deposited material to form an anodic electrochromic layer. The bleached state stabilizing element(s) is/are selected from the group consisting of Y, Ti, Zr, Hf, V, Nb, Ta, Mo, W, B, Al, Ga, In, Si, Ge, Sn, P, Sb and combinations thereof.

A further aspect of the present disclosure is a process for the preparation of a multi-layer electrochromic structure comprising an anodic electrochromic layer on a first substrate. The process comprises forming a liquid mixture comprising a liquid phase and a dispersed phase, depositing a film of a liquid mixture comprising lithium, nickel, and at least one bleached state stabilizing element selected from the group consisting of Y, Ti, Zr, Hf, V, Nb, Ta, Mo, W, B, Al, Ga, In, Si, Ge, Sn, P, Sb and combinations thereof, and treating the deposited material to form an anodic electrochromic layer characterized by a largest d-spacing of at least 2.5 Å.

A further aspect of the present disclosure is a process for the preparation of a multi-layer electrochromic structure comprising an anodic electrochromic layer on a first substrate wherein the anodic electrochromic layer comprises lithium, nickel, and at least one bleached state stabilizing element selected from the group consisting of Y, Ti, Zr, Hf, V, Nb, Ta, Mo, W, B, Al, Ga, In, Si, Ge, Sn, P, Sb and combinations thereof, and the atomic ratio of the amount of lithium to the combined amount of nickel and the bleached state stabilizing element(s) is less than 1.75:1, respectively, when the anodic electrochromic layer is in its fully bleached state. The process comprises forming a liquid mixture comprising a liquid phase and a dispersed phase, depositing a film of a liquid mixture comprising lithium, nickel, and the bleached state stabilizing element(s), and treating the deposited material to form the anodic electrochromic layer.

A further aspect of the present disclosure is a multi-layer electrochromic structure comprising a first substrate and a second substrate, a first and a second electrically conductive layer, a cathode layer, an anodic electrochromic layer, and an ion conductor layer, wherein the first electrically conductive layer is between the first substrate and the anodic electrochromic layer, the anodic electrochromic layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and anodic electrochromic layer. The anodic electrochromic layer comprises lithium, nickel, and at least one bleached state stabilizing element selected from the group consisting of Y, Ti, Zr, Hf, V, Nb, Ta, Mo, W, B, Al, Ga, In, Si, Ge, Sn, P, Sb and combinations thereof, wherein the atomic ratio of the amount of lithium to the combined amount of nickel, and the bleached state stabilizing element(s) in the anodic electrochromic layer is less than 1.75:1, respectively, when the anodic electrochromic layer is in its fully bleached state. The process comprises forming a liquid mixture comprising a liquid phase and a dispersed phase, depositing a film of a liquid mixture comprising lithium, nickel, and the bleached state stabilizing element(s), and treating the deposited material to form the anodic electrochromic layer.

A further aspect of the present disclosure is a multi-layer electrochromic structure comprising a first substrate and a second substrate, a first and a second electrically conductive layer, a cathode layer, an anodic electrochromic layer, and an ion conductor layer, wherein the first electrically conductive layer is between the first substrate and the anodic electrochromic layer, the anodic electrochromic layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the anodic electrochromic layer. The anodic electrochromic layer comprises lithium, nickel, and at least one bleached state stabilizing element selected from the group consisting of Y, Ti, Zr, Hf, V, Nb, Ta, Mo, W, B, Al, Ga, In, Si, Ge, Sn, P, Sb and combinations thereof, wherein the anodic electrochromic layer is characterized by a largest d-spacing of at least 2.5 Å. The process comprises forming a liquid mixture comprising a liquid phase and a dispersed phase, depositing a film of a liquid mixture comprising lithium, nickel, and the bleached state stabilizing element(s), and treating the deposited material to form the anodic electrochromic layer.

A further aspect of the present disclosure is a process for the preparation of a multi-layer structure comprising a lithium nickel oxide film prepared in accordance with the present disclosure.

A further aspect of the present disclosure is a process for the preparation of a multi-layer electrochromic structure comprising an anodic electrochromic film prepared in accordance with the present disclosure.

A further aspect of the present disclosure is a process for forming a multi-layer structure. The process comprises depositing a film of a liquid mixture onto a surface of a substrate and treating the deposited film to form an anodic electrochromic layer on the surface of the substrate wherein the liquid mixture comprises a hydrolysable nickel, a hydrolysable bleached state stabilizing element composition and/or a hydrolysable lithium composition.

A further aspect of the present disclosure is a multi-layer electrochromic structure comprising an electrochromic lithium nickel oxide film prepared in accordance with the present disclosure.

A further aspect of the present disclosure is a process for forming a multi-layer electrochromic structure. The process comprises depositing a film of a liquid mixture onto a surface of a substrate, and treating the deposited film to form an anodic electrochromic layer, the liquid mixture comprising a continuous phase and a dispersed phase, the dispersed phase comprising metal oxide particles, metal hydroxide particles, metal alkoxide particles, metal alkoxide oligomers, gels or particles, or a combination thereof having a number average size of at least 5 nm.

Other objects and features will be in part apparent and in part pointed out hereinafter.

Figure 1:
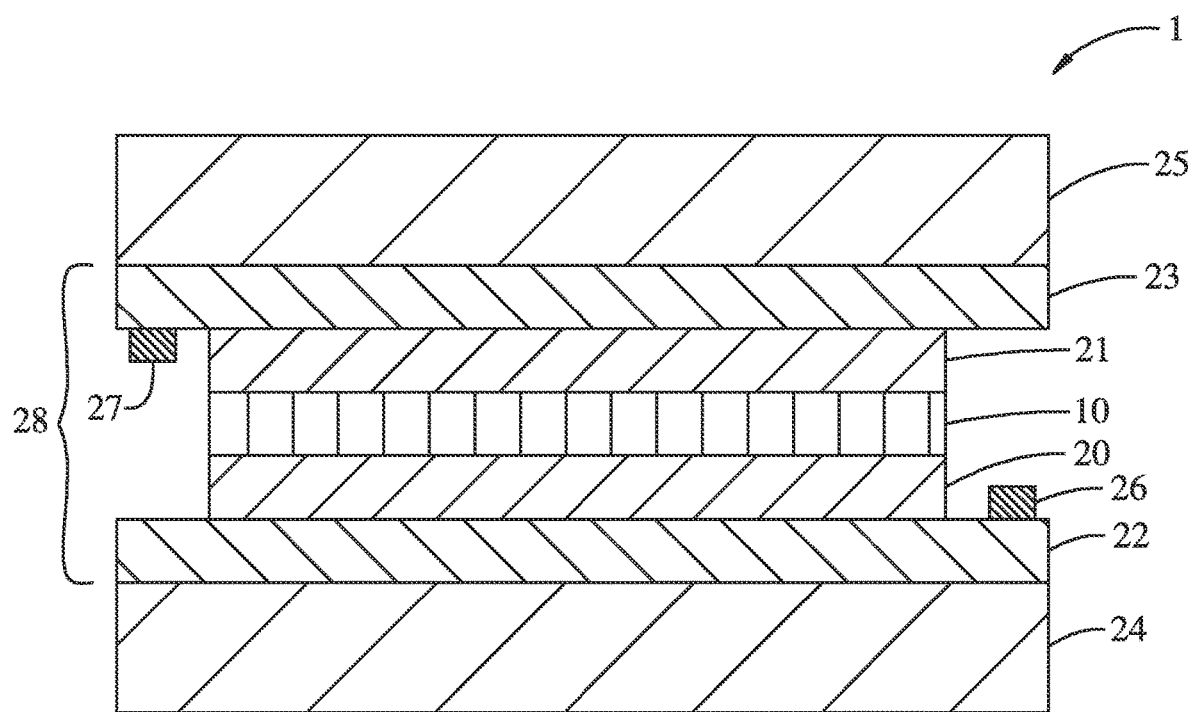
FIG. 1 is a schematic cross-section of a multi-layer electrochromic structure comprising an anodic electrochromic layer of the present disclosure.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions and methods are provided to better define the present disclosure and to guide those of ordinary skill in the art in the practice of the present disclosure. Unless otherwise noted, terms are to be understood according to conventional usage by those of ordinary skill in the relevant art.

Unless otherwise indicated, the alkyl groups described herein are preferably lower alkyls containing from one to eight carbon atoms in the principal chain and up to 20 carbon atoms. They may be linear or branched, chain or cyclic and include methyl, ethyl, propyl, isopropyl, butyl, hexyl, cyclohexyl and the like.

The terms "amine" or "amino," as used herein alone or as part of another group, represents a group of formula —N($R^8$)($R^9$), wherein $R^8$ and $R^9$ are independently hydrogen, hydrocarbyl, substituted hydrocarbyl, silyl, or $R^8$ and $R^9$ taken together form a substituted or unsubstituted cyclic or polycyclic moiety, each as defined in connection with such terms, typically having from 3 to 8 atoms in the ring. "Substituted amine," for example, refers to a group of formula —N($R^8$)($R^9$), wherein at least one of $R^8$ and $R^9$ are other than hydrogen. "Unsubstituted amine," for example, refers to a group of formula —N($R^8$)($R^9$), wherein $R^8$ and $R^9$ are both hydrogen.

The term "alkoxide" as used herein refers to a deprotonated alcohol and is typically used to describe a metal complex of the form $M^1$—OR where $M^1$ is a metal.

The term "amide" as used herein in connection with a metal complex refers to a metal complex of the form $M^1$—N($R^8$)($R^9$) where $M^1$ is a metal.

The term "aryl" as used herein alone or as part of another group denotes optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "anodic electrochromic layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state stabilizing element" as used herein means an element that acts to increase the bleached state voltage of lithium nickel oxide without adversely affecting the transmissivity of its fully bleached state, such as by decreasing the transmissivity of the fully bleached state or by resulting in a shift in the color coordinates of the fully bleached state, such as the creation of a yellow or brown hue to said fully bleached state. In general, bleached state stabilizing elements are those elements that readily form as colorless or lightly colored oxides solids in their highest oxidation state (i.e., formally d0), and where the highest oxidation state is 3+ or greater.

The term "bleached state voltage" refers to the open circuit voltage ($V^{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "coloration efficiency" or "CE" refers to a property of an electrochromic layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{log_{10}\left(\frac{T_{ini}}{T_{final}}\right)}{Q_A}$$

where $Q_A$ is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically and optically matched" (EOM) refers to a set of cathode and anode electrochromic films with similar charge capacities, that are in their complementary optical states (e.g., both in their bleached state, or both in their darkened state or both in an intermediate state of coloration) such that when joined together by a suitable ion-conducting and electrically insulating layer, a functional electrochromic device is formed that shows reversible switching behavior.

The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The terms "halide," "halogen" or "halo" as used herein alone or as part of another group refer to chlorine, bromine, fluorine, and iodine.

The term "heteroatom" shall mean atoms other than carbon and hydrogen.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "rock salt" as used herein describes a cubic structure in which metal cations ("M") occupy all of the octahedral sites of a close packed oxygen array, resulting in the stoichiometry MO. Furthermore, the metals are indistinguishable from one another regardless of whether the metals are the same element or a random distribution of different elements.

The term "silyl" as used herein describes substituents of the general formula $-Si(X^8)(X^9)(X^{10})$ where $X^8$, $X^9$, and $X^{10}$ are independently hydrocarbyl or substituted hydrocarbyl.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters, ethers, and thioethers.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency I_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

Embodiments

In accordance with one aspect of the present disclosure, anodic electrochromic materials comprising lithium, nickel, and at least one bleached state stabilizing element are prepared from a liquid mixture comprising lithium, nickel, and the bleached state stabilizing element(s). The resulting anodic electrochromic films have a range of desirable properties and characteristics. For example, in one embodiment the anodic electrochromic material may have a bleached state voltage value significantly greater than 2.0V. In another embodiment, the anodic electrochromic material is provided in an electrochemically and optically matched (EOM) state relative to a cathodic electrochromic material in its fully bleached state for use in an electrochromic device. In another embodiment, the anodic electrochromic material is relatively stable; for example, the lithium nickel oxide material does not darken from its fully bleached state or deactivate (e.g., remain transparent but no longer function as an electrochromic anode material or film) at elevated temperatures in the presence of ambient air.

Advantageously, bleached state stabilizing element(s) promote the formation of electrochromic lithium nickel oxide materials having favorable bleached state characteristics. In one embodiment, the electrochromic nickel oxide material comprises a bleached state stabilizing element selected from the group consisting of Group 3, Group 4, Group 5, Group 6, Group 13, Group 14 and Group 15 elements (IUPAC classification) and combinations thereof. For example, in one embodiment, the electrochromic nickel oxide material comprises yttrium. By way of further example, in one embodiment, the electrochromic nickel oxide material comprises a naturally occurring Group 4 metal, i.e., titanium, zirconium, hafnium or a combination thereof. By way of further example, in one embodiment, the electrochromic nickel oxide material comprises a naturally occurring Group 5 metal, i.e., vanadium, niobium, tantalum or a combination thereof. By way of further example, in one embodiment, the electrochromic nickel oxide material comprises a Group 6 metal, e.g., molybdenum, tungsten or a combination thereof. By way of further example, in one embodiment, the electrochromic nickel oxide material comprises a Group 13 element, e.g., boron, aluminum, gallium, indium or a combination thereof. By way of further example, in one embodiment, the electrochromic nickel oxide material comprises a Group 14 element selected from silicon, germanium, tin and combinations thereof. By way of further example, in one embodiment, the electrochromic nickel oxide material comprises a Group 15 element selected from phosphorous, antimony, or a combination thereof. By way of further example, in one embodiment, the electrochromic nickel oxide material comprises a bleached state stabilizing element selected from the group consisting of Y, Ti, Zr, Hf, V, Nb, Ta, Mo, W, B, Al, Ga, In, Si, Ge, Sn, P, Sb and combinations thereof. In certain exemplary embodiments, the electrochromic nickel oxide material comprises a bleached state stabilizing element selected from the group consisting of Y, Ti, Zr, Hf, V, Nb, Ta, Mo, W, B, Al, Ga, In, Si, Ge, Sn, P, and combinations thereof. In certain exemplary embodiments, the electrochromic nickel oxide material comprises a bleached state stabilizing element selected from the group consisting of Y, Ti, Zr, Hf, V, Nb, Ta, Mo, W, B, Al, Ga, In, Si, Ge, Sn and combinations thereof. In certain exemplary embodiments, the electrochromic nickel oxide material comprises a bleached state stabilizing element selected from the group consisting of Y, Ti, Zr, Hf, V, Nb, Ta, Mo, W, B, Al, Ga, In, and combinations thereof. In certain exemplary embodiments, the electrochromic nickel oxide material comprises a bleached state stabilizing element selected from the group consisting of Y, Ti, Zr, Hf, V, Nb, Ta, Mo, W, and combinations thereof. In certain exemplary embodiments, the electrochromic nickel oxide material comprises a bleached state stabilizing element selected from the group consisting of Ti, Zr, Hf, V, Nb, Ta, Mo, W, and combinations thereof. In certain exemplary embodiments, the electrochromic nickel oxide material comprises a bleached state stabilizing element selected from the group consisting of Ti, Zr, Hf, Ta, V, Nb, W and combinations thereof. In certain exemplary embodiments, the electrochromic nickel oxide material comprises a bleached state stabilizing element selected from the group consisting of Ti, Zr, Hf and combinations thereof. In certain exemplary embodiments, the electrochromic nickel oxide material comprises a bleached state stabilizing element selected from the group consisting of Zr, Hf, and a combination thereof. In certain exemplary embodiments, the electrochromic nickel oxide material comprises a bleached state stabilizing element selected from the group consisting of V, Nb, Ta, and a combination thereof. In certain exemplary embodiments, the electrochromic nickel oxide material comprises a bleached state stabilizing element selected from the group consisting of Nb, Ta, and a combination thereof. In certain exemplary embodiments, the electrochromic nickel oxide material comprises a bleached state stabilizing element selected from the group consisting of Mo and W and a combination thereof. By way of further example, in certain exemplary embodiments, the electrochromic nickel oxide material comprises Ti. By way of further example, in certain exemplary embodiments, the electrochromic nickel oxide material comprises Zr. By way of further example, in certain exemplary embodiments, the electrochromic nickel oxide material comprises Hf. By way of further example, in certain exemplary embodiments, the electrochromic nickel oxide material comprises V. By way of further example, in certain exemplary embodiments, the electrochromic nickel oxide material comprises Nb. By way of further example, in certain exemplary embodiments, the electrochromic nickel oxide material comprises Ta. By way of further example, in certain exemplary embodiments, the electrochromic nickel oxide material comprises Mo. By way of further example, in certain exemplary embodiments, the electrochromic nickel oxide material comprises W. By way of further example, in certain exemplary embodiments, the electrochromic nickel oxide material comprises B. By way of further example, in certain exemplary embodiments, the electrochromic nickel oxide material comprises Al. By way of further example, in certain exemplary embodiments, the electrochromic nickel oxide material comprises Ga. By way of further example, in certain exemplary embodiments, the electrochromic nickel oxide material comprises In. By way of further example, in certain exemplary embodiments, the electrochromic nickel oxide material comprises Si. By way of further example, in certain exemplary embodiments, the electrochromic nickel oxide material comprises Ge. By way of further example, in certain exemplary embodiments, the electrochromic nickel oxide material comprises Sn. By way of further example, in certain exemplary embodiments, the electrochromic nickel oxide material comprises P. By way of further example, in certain exemplary embodiments, the electrochromic nickel oxide material comprises Sb.

In one embodiment, the anodic electrochromic film comprising a lithium nickel oxide material prepared by the process of the present disclosure is characterized by a largest d-spacing of at least 2.5 Å by diffraction techniques such as electron diffraction ("ED") and X-ray diffraction ("XRD") analysis. For example, in one embodiment the lithium nickel oxide material is characterized by a largest d-spacing of at least 2.75 Å. By way of further example, in one embodiment the anodic electrochromic material is characterized by a largest d-spacing of at least 3 Å. By way of further example, in one embodiment the anodic electrochromic material is characterized by a largest d-spacing of at least 3.25 Å. By way of further example, in one embodiment the anodic electrochromic material is characterized by a largest d-spacing of at least 3.5 Å. By way of further example, in one embodiment the anodic electrochromic material is characterized by a largest d-spacing of at least 4 Å. By way of further example, in one embodiment the anodic electrochromic material is characterized by a largest d-spacing of at least 4.5 Å.

In accordance with one aspect of the present disclosure, the relative amounts of lithium, nickel and bleached state stabilizing element(s) in the electrochromic lithium nickel oxide material are controlled such that an atomic ratio of the amount of lithium to the combined amount of nickel and all bleached state stabilizing element(s) in the electrochromic lithium nickel oxide material is generally at least about 0.4:1, respectively, wherein the bleached state stabilizing element(s) is/are selected from the group consisting of Group 3, Group 4, Group 5, Group 6, Group 13, Group 14 and Group 15 elements, and combinations thereof. For example, in one embodiment, the atomic ratio of lithium to the combined amount of nickel and all bleached state stabilizing elements, i.e., Li:[Ni+M], in the electrochromic lithium nickel oxide material is at least about 0.4:1, respectively, wherein M is a bleached state stabilizing element selected from the group consisting of Y, Ti, Zr, Hf, V, Nb, Ta, Mo, W, B, Al, Ga, In, Si, Ge, Sn, P, Sb, and combinations thereof; stated differently, the ratio of the amount of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is at least 0.4:1 (atomic ratio). By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 0.75:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 0.9:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 1:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 1.25:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 1.5:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 2:1, respectively. By way of further example, in one such embodiment the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) is at least about 2.5:1, respectively. In certain embodiments, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will not exceed about 4:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 0.75:1 to about 3:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 0.9:1 to about 2.5:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 1:1 to about 2.5:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 1.1:1 to about 1.5:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 1.5:1 to about 2:1, respectively. In some embodiments, therefore, the atomic ratio of lithium to the combined amount of nickel and all bleached state stabilizing element(s) M in the electrochromic lithium nickel oxide material (e.g., wherein M is Y, Ti, Zr, Hf, V, Nb, Ta, Mo, W, B, Al, Ga, In, Si, Ge, Sn, P, Sb or a combination thereof) will be in the range about 2:1 to about 2.5:1, respectively.

In one embodiment, the electrochromic nickel oxide material comprises one or more bleached state stabilizing elements selected from the group consisting of Group 3, Group 4, Group 5, Group 6, Group 13, Group 14 and Group 15 elements (IUPAC classification), and combinations thereof in addition to nickel. In such embodiments, the relative amounts of lithium, nickel, and the bleached state stabilizing element(s) in the electrochromic lithium nickel oxide material are controlled such that an atomic ratio of the amount of lithium to the combined amount of nickel, and bleached state stabilizing element(s) in the electrochromic lithium nickel oxide material is generally less than about 1.75:1, respectively, wherein the bleached state stabilizing element(s) is/are selected from the group consisting of Group 3, Group 4, Group 5, Group 6, Group 13, Group 14 and Group 15 elements, and combinations thereof, and the electrochromic nickel oxide material is in its fully bleached state. For example, in one embodiment, the atomic ratio of lithium to the combined amount of nickel and all bleached state stabilizing elements, i.e., Li:[Ni+M], in the electrochromic lithium nickel oxide material is less than about 1.75:1, respectively, wherein M is a bleached state stabilizing element selected from the group consisting of Y, V, Nb, Ta, Mo, W, B, Al, Ga, In, Si, Ge, Sn, P, Sb, and combinations thereof and the electrochromic nickel oxide material is in its fully bleached state; stated differently, the ratio of the amount of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.75:1 (atomic ratio), respectively, when the electrochromic lithium nickel oxide material is in its fully bleached state. For example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.5:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.45:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.4:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.35:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.3:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.25:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.2:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.15:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.1:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.05:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.9:1 to 1.35:1, respectively, when the electrochromic lithium nickel oxide material is in its fully bleached state.

In general, increasing the total amount of the bleached state stabilizing element(s) relative to the amount of nickel in the electrochromic lithium nickel oxide material increases the stability of the bleached state and the bleached state voltage of the material but it also tends to decrease its volumetric charge capacity. Anodic electrochromic lithium nickel oxide material having large amounts of bleached state stabilizing element(s) relative to nickel, such as those in which the atomic ratio of the combined amount of all such bleached state stabilizing elements M to the combined amount of nickel and all such bleached state stabilizing elements M (i.e., M:[Ni+M]) is greater than about 0.8:1, respectively, tend to have stable fully bleached states, but sub-optimal charge capacities and darkened state transmissivities. Thus, in certain embodiments it is preferred that the atomic ratio of the combined amount of all such bleached state stabilizing elements M to the combined amount of nickel and all such bleached state stabilizing elements M in the electrochromic lithium nickel oxide material be less than about 0.8:1 (i.e., M:[Ni+M]). For example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is less than about 0.7:1 (i.e., M:[Ni+M]). By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is less than about 0.6:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is less than about 0.5:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is less than about 0.4:1.

Conversely, anodic electrochromic lithium nickel oxide materials having small amounts of bleached state stabilizing elements (in combination) relative to nickel, such as those in which the atomic ratio of the combined amount of all such bleached state stabilizing elements to the combined amount of nickel and all such bleached state stabilizing elements (i.e., M:[Ni+M])) is less than about 0.025:1, respectively, tend to have relatively high charge capacities but less stable fully bleached states. Thus, in certain embodiments it is preferred that the ratio (atomic) of the combined amount of all such bleached state stabilizing elements M to the combined amount of nickel and all such bleached state stabilizing elements M in the electrochromic lithium nickel oxide material be greater than about 0.03:1 (i.e., M:[Ni+M]). For example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is greater than about 0.04:1 (i.e., M:[Ni+M]). By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is greater than about 0.05:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is greater than about 0.075:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) to the combined amount of nickel and all such bleached state stabilizing elements M in the electrochromic lithium nickel oxide material is greater than about 0.1:1.

In general, the ratio (atomic) of the combined amount of all such bleached state stabilizing elements to the combined amount of nickel and all such bleached state stabilizing elements M (e.g., wherein M is Y, Ti, Zr, Hf, V, Nb, Ta, Mo, W, B, Al, Ga, In, Si, Ge, Sn, P, Sb or a combination thereof) in the anodic electrochromic lithium nickel oxide material will typically be in the range of about 0.025:1 to about 0.8:1 (M:[Ni+M]). For example, in one such embodiment the atomic ratio of the combined amount of all such bleached state stabilizing element(s) M to the combined amount of nickel and all such bleached state stabilizing elements M in the anodic electrochromic lithium nickel oxide material will typically be in the range of about 0.05:1 and about 0.7:1 (M:[Ni+M]). By way of further example, in one such embodiment the atomic ratio of the combined amount of all such bleached state stabilizing element(s) M to the combined amount of nickel and all such bleached state stabilizing elements M in the anodic electrochromic lithium nickel oxide material will typically be in the range of about 0.075:1 and about 0.6:1 (M:[Ni+M]).

In one embodiment, the anodic electrochromic lithium nickel oxide material has a bleached state voltage that is at least 2V. For example, in one embodiment the anodic electrochromic lithium nickel oxide material has a bleached state voltage of at least 2.5V. By way of further example, in one embodiment the anodic electrochromic lithium nickel oxide material has a bleached state voltage of at least 3V. By way of further example, in one embodiment the anodic electrochromic lithium nickel oxide material has a bleached state voltage of at least 3.5V.

Electrochromic Stacks and Devices

FIG. 1 depicts a cross-sectional structural diagram of an electrochromic structure 1 having an anodic electrochromic layer comprising lithium, nickel, and at least one bleached state stabilizing element in accordance with one embodiment of the present disclosure. Moving outward from the center, electrochromic structure 1 comprises an ion conductor layer 10. Anode layer 20 (an anodic electrochromic layer comprising lithium, nickel, and at least one bleached state stabilizing element as described in greater detail elsewhere herein) is on one side of and in contact with a first surface of ion conductor layer 10. Cathode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. Elements 22, 20, 10, 21, and 23 are collectively referred to as an electrochromic stack 28.

Ion conductor layer 10 serves as a medium through which lithium ions are transported (in the manner of an electrolyte) when the electrochromic device transforms between the bleached state and the darkened state. Ion conductor layer 10 comprises an ion conductor material and may be transparent or non-transparent, colored or non-colored, depending on the application. Preferably, ion conductor layer 10 is highly conductive to lithium ions and has sufficiently low electron conductivity that negligible electron transfer takes place during normal operation.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt;

and composite organic-inorganic electrolytes (CE), comprising an LE with an addition of titania, silica or other oxides. Some non-exclusive examples of lithium salts used are LiTFSI (lithium bis(trifluoromethane) sulfonimide), LiBF$_4$ (lithium tetrafluoroborate), LiPF$_6$ (lithium hexafluorophosphate), LiAsF$_6$ (lithium hexafluoro arsenate), LiCF$_3$SO$_3$ (lithium trifluoromethane sulfonate), LiB(C$_6$F$_5$)$_4$ (lithium perfluorotetraphenylboron) and LiClO$_4$ (lithium perchlorate). Additional examples of suitable ion conductor layers include silicates, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conductor layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

Anode layer 20 is an electrochromic layer comprising lithium, nickel, and at least one bleached state stabilizing element as described in greater detail elsewhere herein. In one embodiment, cathode layer 21 is an electrochromic layer. For example, cathode layer 21 may comprise an electrochromic oxide based on tungsten, molybdenum, niobium, titanium, and/or bismuth. In an alternative embodiment, cathode layer 21 is a non-electrochromic counter-electrode for anode layer 20 such as cerium oxide.

The thickness of anode layer 20 and cathode layer 21 will depend upon the electrochromic material selected for the electrochromic layer and the application. In some embodiments, anode layer 20 will have a thickness in the range of about 25 nm to about 2000 nm. For example, in one embodiment anode layer 20 has a thickness of about 50 nm to about 2000 nm. By way of further example, in one embodiment anode layer 20 has a thickness of about 25 nm to about 1000 nm. By way of further example, in one such embodiment, anode layer 20 has an average thickness between about 100 nm and about 700 nm. In some embodiments, anode layer 20 has a thickness of about 250 nm to about 500 nm. Cathode layer 21 will typically have thicknesses in the same ranges as those stated for anode layer 20. One of skill in the art will appreciate that certain relationships exist between the thickness of the anode or cathode layer, and the materials deposited to comprise the anode or cathode layer. For example, if the average thickness of the anode or cathode layer is between about 250 nm to about 500 nm, then anode or cathode precursor materials that comprise the liquid mixtures used to deposit the anode or cathode layers will likely be composed of species that are smaller than 250 nm to 500 nm.

In one embodiment, anode layer 20 and cathode layer 21 are in electrochemically and optically matched (EOM) states. For example, when the cathode is a W-oxide film having a thickness of about 400 nm and an area charge capacity of 27 mC/cm$^2$, the anode may be a lithium tungsten nickel oxide film having a thickness of about 250 nm and a charge capacity of 27 mC/cm$^2$ over a cell voltage of about 1.7V (where 0V is the fully bleached state of both anode and cathode).

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage pulse to electrically conductive layers 22 and 23. The pulse causes electrons and ions to move between anode layer 20 and cathode layer 21 and, as a result, the anode layer 20 and, optionally, cathode layer 21 change(s) optical states, thereby switching electrochromic structure 1 from a more transmissive state to a less transmissive state, or from a less transmissive state to a more transmissive state. In one embodiment, electrochromic structure 1 is transparent before the voltage pulse and less transmissive (e.g., more reflective or colored) after the voltage pulse or vice versa.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protective coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass. In some embodiments of electrochromic structure 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the disclosure, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic structures of the present disclosure may have a wide range of sizes. In general, it is preferred that the electrochromic structure comprise a substrate having a surface with a surface area of at least 0.001 meter$^2$. For example, in certain embodiments, the electrochromic structure comprises a substrate having a surface with a surface area of at least 0.01 meter$^2$. By way of further example, in certain embodiments, the electrochromic structure comprises a substrate having a surface with a surface area of at least 0.1 meter$^2$. By way of further example, in certain embodiments, the electrochromic structure comprises a substrate having a surface with a surface area of at least 1 meter$^2$. By way of further example, in certain embodiments, the electrochromic structure comprises a substrate having a surface with a surface area of at least 5 meter$^2$. By way of further example, in certain embodiments, the electrochromic structure comprises a substrate having a surface with a surface area of at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nanoparticles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8Ω/□.

To facilitate more rapid switching of electrochromic structure 1 from a state of relatively greater transmittance to a state of relatively lesser transmittance, or vice versa, at least one of electrically conductive layers 22, 23 may have a sheet resistance, $R_s$, to the flow of electrons through the layer that is non-uniform. For example, in one embodiment only one of first and second electrically conductive layers 22, 23 has a non-uniform sheet resistance to the flow of electrons through the layer. Alternatively, first electrically conductive layer 22 and second electrically conductive layer 23 may each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide a uniform potential drop or a desired non-uniform potential drop across the device, over the area of the device as more fully described in WO2012/109494.

Figure 2:
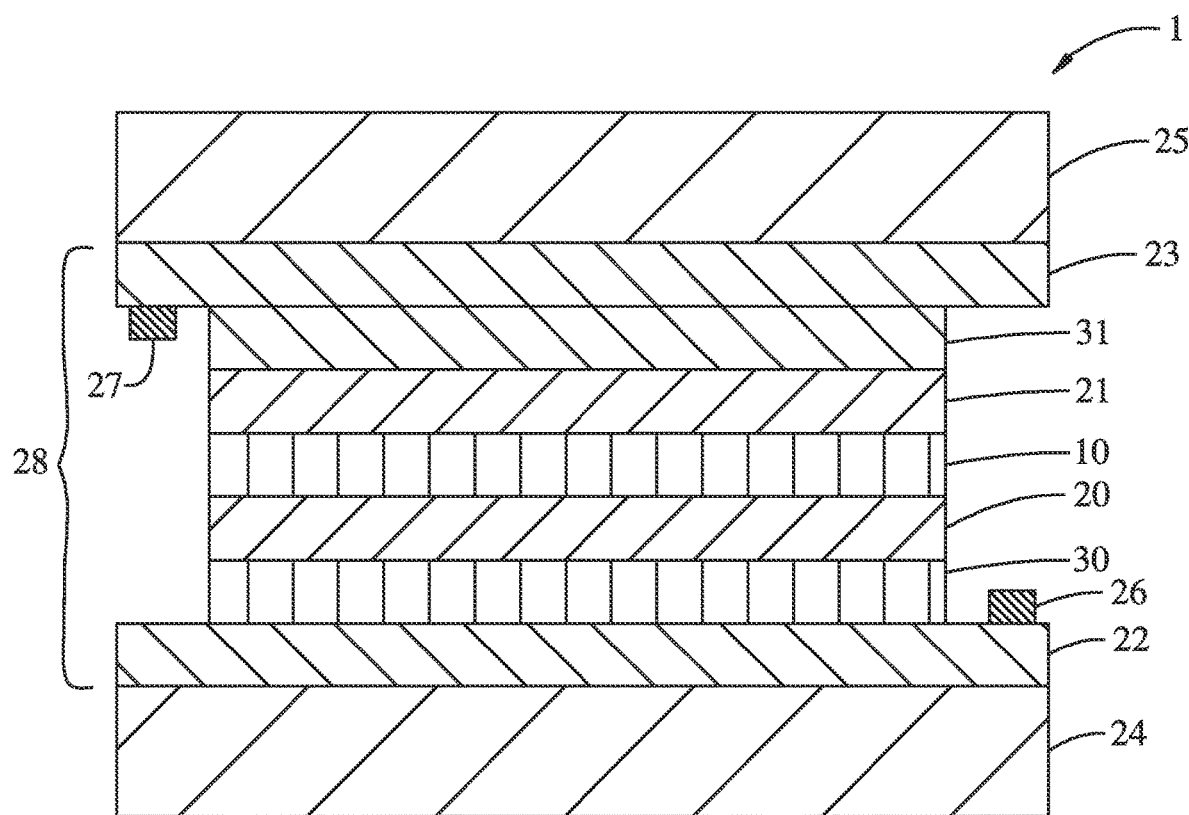
FIG. 2 is a schematic cross-section of an alternative embodiment of a multi-layer electrochromic structure comprising an anodic electrochromic layer of the present disclosure.

FIG. 2 depicts a cross-sectional structural diagram of electrochromic structure 1 according to an alternative embodiment of the present disclosure. Moving outward from the center, electrochromic structure 1 comprises an ion conductor layer 10. Anode electrode layer 20 (an electrochromic layer comprising lithium, nickel, and at least one bleached state stabilizing element as described in greater detail elsewhere herein) is on one side of and in contact with a first surface of ion conductor layer 10, and cathode layer 21 is on the other side of and in contact with a second surface of ion conductor layer 10. First and second current modulating structures 30 and 31, in turn, are adjacent first and second electrically conductive layers 22 and 23, respectively, which are arranged against outer substrates 24, 25, respectively.

To facilitate more rapid switching of electrochromic structure 1 from a state of relatively greater transmittance to a state of relatively lesser transmittance, or vice versa, first current modulating structure 30, second current modulating structure 31 or both first and second current modulating structures 30 and 31 comprise a resistive material (e.g., a material having a resistivity of at least about $10^4 \Omega \cdot cm$). In one embodiment at least one of first and second current modulating structures 30, 31 has a non-uniform cross-layer resistance, $R_C$, to the flow of electrons through the structure. In one such embodiment only one of first and second current modulating structures 30, 31 has a non-uniform cross-layer resistance, $R_C$, to the flow of electrons through the layer. Alternatively, and more typically, first current modulating structure 30 and second current modulating structure 31 each have a non-uniform cross-layer resistance, $R_C$, to the flow of electrons through the respective layers. Without being bound by any particular theory, it is presently believed that spatially varying the cross-layer resistance, $R_C$, of first current modulating structure 30 and second current modulating structure 31, spatially varying the cross-layer resistance, $R_C$, of the first current modulating structure 30, or spatially varying the cross-layer resistance, $R_C$, of the second current modulating structure 31 improves the switching performance of the device by providing a more uniform potential drop or a desired non-uniform potential drop across the device, over the area of the device.

In one exemplary embodiment, current modulating structure 30 and/or 31 is a composite comprising at least two materials possessing different conductivities. For example, in one embodiment the first material is a resistive material having a resistivity in the range of about $10^4 \Omega \cdot cm$ to $10^{10} \Omega \cdot cm$ and the second material is an insulator. By way of further example, in one embodiment the first material is a resistive material having a resistivity of at least $10^4 \Omega \cdot cm$ and the second material has a resistivity that exceeds the resistivity of the first by a factor of at least $10^2$. By way of further example, in one embodiment the first material is a resistive material having a resistivity of at least $10^4 \Omega \cdot cm$ and the second material has a resistivity that exceeds the resistivity of the first by a factor of at least $10^3$. By way of further example, in one embodiment the first material is a resistive material having a resistivity of at least $10^4 \Omega \cdot cm$ and the second material has a resistivity that exceeds the resistivity of the first by a factor of at least $10^4$. By way of further example, in one embodiment the first material is a resistive material having a resistivity of at least $10^4 \Omega \cdot cm$ and the second material has a resistivity that exceeds the resistivity of the first by a factor of at least $10^5$. By way of further example, in one embodiment, at least one of current modulating structures 30, 31 comprises a first material having a resistivity in the range of $10^4$ to $10^{10} \Omega \cdot cm$ and a second material that is an insulator or has a resistivity in the range of $10^{10}$ to $10^{14} \Omega \cdot cm$. By way of further example, in one embodiment, at least one of current modulating structures 30, 31 comprises a first material having a resistivity in the range of $10^4$ to $10^{10} \Omega \cdot cm$ and a second material having a resistivity in the range of $10^{10}$ to $10^{14} \Omega \cdot cm$ wherein the resistivities of the first and second materials differ by a factor of at least $10^3$. By whay of further example, in one embodiment, at least one of current modulating structures 30, 31 comprises a first material having a resistivity in the range of $10^4$ to $10^{10} \Omega \cdot cm$ and a second material having a resistivity in the range of $10^{10}$ to $10^{14} \Omega \cdot cm$ wherein the resistivities of the first and second materials differ by a factor of at least $10^4$. By way of further example, in one embodiment, at least one of current modulating structures 30, 31 comprises a first material having a resistivity in the range of $10^4$ to $10^{10} \Omega \cdot cm$ and a second material having a resistivity in the range of $10^{10}$ to $10^{14} \Omega \cdot cm$ wherein the resistivities of the first and second materials differ by a factor of at least $10^5$. In each of the foregoing exemplary embodiments, each of current modulating structures 30, 31 may comprise a first material having a resistivity in the range of $10^4$ to $10^{10} \Omega \cdot cm$ and a second material that is insulating.

Depending upon the application, the relative proportions of the first and second materials in current modulating structure 30 and/or 31 may vary substantially. In general, however, the second material (i.e., the insulating material or material having a resistivity of at least $10^{10} \Omega \cdot cm$) constitutes at least about 5 vol % of at least one of current modulating structures 30, 31. For example, in one embodiment the second material constitutes at least about 10 vol % of at least one of current modulating structures 30, 31. By way of further example, in one embodiment the second material constitutes at least about 20 vol % of at least one of current modulating structures 30, 31. By way of further example, in one embodiment the second material constitutes at least about 30 vol % of at least one of current modulating structures 30, 31. By way of further example, in one embodiment the second material constitutes at least about 40 vol % of at least one of current modulating structures 30, 31. In general, however, the second material will typically not constitute more than about 70 vol % of either of current modulating structures 30, 31. In each of the foregoing embodiments and as previously discussed, the second material may have a resistivity in the range of $10^{10}$ to $10^{14} \Omega \cdot cm$ and the resistivities of the first and second materials (in either or both of current modulating structures 30, 31) may differ by a factor of at least $10^3$.

In general, first and second current modulating structures 30, 31 may comprise any material exhibiting sufficient resistivity, optical transparency, and chemical stability for the intended application. For example, in some embodiments, current modulating structures 30, 31 may comprise a resistive or insulating material with high chemical stability. Exemplary insulator materials include alumina, silica, porous silica, fluorine doped silica, carbon doped silica, silicon nitride, silicon oxynitride, hafnia, magnesium fluoride, magnesium oxide, poly(methyl methacrylate) (PMMA), polyimides, polymeric dielectrics such as polytetrafluoroethylene (PTFE) and silicones. Exemplary resistive materials include zinc oxide, zinc sulfide, titanium oxide, and gallium (III) oxide, yttrium oxide, zirconium oxide, aluminum oxide, indium oxide, stannic oxide and germanium oxide. In one embodiment, one or both of first and second current modulating structures 30, 31 comprise one or more of such resistive materials. In another embodiment, one or both of first and second current modulating structures 30, 31 comprise one or more of such insulating materials. In another embodiment, one or both of first and second current modulating structures 30, 31 comprise one or more of such resistive materials and one or more of such insulating materials.

The thickness of current modulating structures 30, 31 may be influenced by the composition of the material comprised by the structures and its resistivity and transmissivity. In some embodiments, current modulating structures 30 and 31 are transparent and each have a thickness that is between about 50 nm and about 1 micrometer. In some embodiments, the thickness of current modulating structures 30 and 31 is between about 100 nm and about 500 nm. In general, thicker or thinner layers may be employed so long as they provide the necessary electrical properties (e.g., conductivity) and optical properties (e.g., transmittance). For certain applications it will generally be preferred that current modulating structures 30 and 31 be as thin as possible to increase transparency and to reduce cost.

Liquid Mixtures

Anodic electrochromic layers comprising lithium nickel oxide compositions may be prepared, in accordance with one aspect of the present disclosure from a liquid mixture containing lithium, nickel, and at least one bleached state stabilizing element selected from the group consisting of Group 3, Group 4, Group 5, Group 6, Group 13, Group 14 and Group 15 elements, and combinations thereof. For example, in one embodiment, the liquid mixture is deposited on the surface of a substrate to form a film comprising lithium, nickel, and at least one such bleached state stabilizing element and the deposited film is then treated to form an anodic electrochromic layer containing lithium, nickel and the bleached state stabilizing element(s).

The liquid mixture deposited onto the substrate surface comprises a continuous (liquid) phase and a discontinuous phase comprising a dispersed species. In general, the dispersed species has a (number) average size greater than 5 nm. For example, in some embodiments the dispersed species has a (number) average size greater than 10 nm. By way of further example, in some embodiments the dispersed species has a (number) average size greater than 25 nm. By way of further example, in some embodiments the dispersed species has a (number) average size greater than 50 nm. By way of further example, in some embodiments the dispersed species has a (number) average size greater than 75 nm. By way of further example, in some embodiments the dispersed species has a (number) average size greater than 100 nm. In general, however, the dispersed species has a (number) average size that is less than 200 nm. For example, in some embodiments the dispersed species has a (number) average size less than 150 nm. By way of further example, in some embodiments the dispersed species has a (number) average size less than 125 nm. By way of further example, in some embodiments the dispersed species has a (number) average size less than 100 nm. By way of further example, in some embodiments the dispersed species has a (number) average size in the range of 10 nm to 50 nm (e.g., 25 nm-50 nm) or a (number) average size in the range of 50 nm-100 nm (e.g., 50 nm-80 nm). Dependent upon the methodology used to prepare the dispersion, the dispersed species may comprise discrete particles such as metal oxide particles, metal hydroxide particles, metal alkoxide particles, metal alkoxide oligomers, gels or particles, or a combination thereof, each of which may independently possess any of the aforementioned average sizes or fall within any of the aforementioned size ranges.

In one embodiment, the relative amounts of lithium, nickel and the bleached state stabilizing element(s) in the liquid mixture are controlled such that an atomic ratio of lithium to the combined amount of nickel and bleached state stabilizing element(s) in the deposited film is generally at least about 0.4:1, respectively. For example, in one such embodiment, the atomic ratio of lithium to the combined amount of nickel and bleached state stabilizing element(s) M in the liquid mixture is at least about 0.4:1 (Li:[Ni+M]), respectively, wherein M is a bleached state stabilizing element selected from the group consisting of Y, Ti, Zr, Hf, V, Nb, Ta, Mo, W, B, Al, Ga, In, Si, Ge, Sn, Sb and combinations thereof; stated differently, the atomic ratio of the amount of lithium to the combined amount of Ni, Y, Ti, Zr, Hf, V, Nb, Ta, Mo, W, B, Al, Ga, In, Si, Ge, Sn, and Sb, in the liquid mixture is at least 0.4:1 (Li:[Ni+M]). By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 0.75:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, P, Sb or a combination thereof) is at least about 0.9:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 1:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 1.25:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 1.5:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 2:1, respectively. By way of further example, in one such embodiment the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) is at least about 2.5:1, respectively.

In certain embodiments, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will not exceed about 4:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will be in the range about 0.75:1 to about 3:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, P, Sb or a combination thereof) will be in the range about 0.9:1 to about 2.5:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will be in the range about 1:1 to about 2.5:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will be in the range about 1.1:1 to about 1.5:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will be in the range about 1.5:1 to about 2:1, respectively. In some embodiments, therefore, the atomic ratio of lithium to the combined amount of nickel and all bleached state stabilizing element(s) M in the liquid mixture (e.g., wherein M is Y, Ti, Zr, Hf, V, Nb, Ta, Mo, W, B, Al, Ga, In, Si, Ge, Sn, Sb or a combination thereof) will be in the range about 2:1 to about 2.5:1, respectively.

The atomic ratio of the relative amount of nickel and the bleached state stabilizing element(s) in the liquid mixture will typically be less than about 0.8:1 (M:[Ni+M]) wherein the bleached state stabilizing element(s) is/are selected from the group consisting of is Y, Ti, Zr, Hf, V, Nb, Ta, Mo, W, B, Al, Ga, In, Si, Ge, Sn, Sb and combinations thereof. Thus, for example, in certain embodiments the atomic ratio of the combined amount of all such bleached state stabilizing elements M to the combined amount of nickel and the bleached state stabilizing elements M in the liquid mixture will be less than about 0.7:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is less than about 0.6:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to nickel and such bleached state stabilizing elements in the liquid mixture is less than about 0.5:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to nickel and such bleached state stabilizing elements in the liquid mixture is less than about 0.4:1.

The atomic ratio of the relative amount of nickel and the bleached state stabilizing element(s) in the liquid mixture will typically be at least about 0.025:1 (M:[Ni+M]) wherein the bleached state stabilizing element(s) is/are selected from the group consisting of is Y, Ti, Zr, Hf, V, Nb, Ta, Mo, W, B, Al, Ga, In, Si, Ge, Sn, Sb and combinations thereof. For example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.03:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.05:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.075:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.1:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.15:1. By way of further example, in one such embodiment the atomic ratio of the combined amount of all such bleached state stabilizing elements M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is greater than about 0.25:1. In each of the foregoing embodiments, the element(s) M may be selected from a more limited set of bleached state stabilizing elements. For example, in each of the foregoing embodiments, the bleached state stabilizing element may be selected from the group consisting of Y, Ti, Zr, Hf, Nb, Ta, Mo, W, B, Al, Ga, In, Si, and combinations thereof. By way of further example, in each of the foregoing embodiments, the bleached state stabilizing element may be selected from the group consisting of Y, Ti, Zr, Hf, Nb, Ta, Mo, W, B, Al, Ga, In, and combinations thereof. By way of further example, in each of the foregoing embodiments, the bleached state stabilizing element may be selected from the group consisting of Y, Ti, Zr, Hf, Nb, Ta, Mo, W, and combinations thereof. By way of further example, in each of the foregoing embodiments, the bleached state stabilizing element may be selected from the group consisting of Ti, Zr, Hf, Nb, Ta, Mo, W, and combinations thereof. By way of further example, in each of the foregoing embodiments, the bleached state stabilizing element may be selected from the group consisting of Ti, Zr, Hf and combinations thereof. By way of further example, in each of the foregoing embodiments, the bleached state stabilizing element may be selected from the group consisting of Zr, Hf, and a combination thereof. By way of further example, in each of the foregoing embodiments, the bleached state stabilizing element may be selected from the group consisting of Nb, Ta, and a combination thereof. By way of further example, in each of the foregoing embodiments, the bleached state stabilizing element may be Ti. By way of further example, in each of the foregoing embodiments, the bleached state stabilizing element may be Zr. By way of further example, in each of the foregoing embodiments, the bleached state stabilizing element may be Hf. By way of further example, in each of the foregoing embodiments, the bleached state stabilizing element may be Nb. By way of further example, in each of the foregoing embodiments, the bleached state stabilizing element may be Ta. By way of further example, in each of the foregoing embodiments, the bleached state stabilizing element may be Mo. By way of further example, in each of the foregoing embodiments, the bleached state stabilizing element may be W. By way of further example, in each of the foregoing embodiments, the bleached state stabilizing element may be B. By way of further example, in each of the foregoing embodiments, the bleached state stabilizing element may be Al. By way of further example, in each of the foregoing embodiments, the bleached state stabilizing element may be Ga. By way of further example, in each of the foregoing embodiments, the bleached state stabilizing element may be In. By way of further example, in each of the foregoing embodiments, the bleached state stabilizing element may be Si. By way of further example, in each of the foregoing embodiments, the bleached state stabilizing element may be Ge. By way of further example, in each of the foregoing embodiments, the bleached state stabilizing element may be Sn. By way of further example, in each of the foregoing embodiments, the bleached state stabilizing element may be Sb. By way of further example, in each of the foregoing embodiments, the bleached state stabilizing element may be selected from the group consisting of Mo and W and a combination thereof. By way of further example, in each of the foregoing embodiments, the bleached state stabilizing element may be selected from the group consisting of Ti, Zr, Hf, Ta, Nb, W and combinations thereof.

The atomic ratio of the relative amount of nickel and the bleached state stabilizing element(s) in the liquid mixture will typically be in the range of about 0.025:1 to about 0.8:1 (M:[Ni+M]) wherein the bleached state stabilizing element(s) is/are selected from the group consisting of is Y, Ti, Zr, Hf, V, Nb, Ta, Mo, W, B, Al, Ga, In, Si, Ge, Sn, Sb and combinations thereof. For example, in one such embodiment the atomic ratio of the combined amount of all such bleached state stabilizing element(s) M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is between about 0.04:1 and about 0.75:1 (M:[Ni+M]). By way of further example, in one such embodiment the atomic ratio of the combined amount of all such bleached state stabilizing element(s) M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is between about 0.05:1 and about 0.65:1 (M:[Ni+M]). By way of further example, in one such embodiment the atomic ratio of the combined amount of all such bleached state stabilizing element(s) M (e.g., wherein M is Y, Ti, Zr, Hf, V, Nb, Ta, Mo, W, B, Al, Ga, In, Si, Ge, Sn, Sb or a combination thereof) to the combined amount of nickel and such bleached state stabilizing elements in the liquid mixture is between about 0.1:1 and about 0.6:1 (M:[Ni+M]). In each of the foregoing embodiments, the element(s) M may be selected from a more limited set of bleached state stabilizing elements. For example, in each of the foregoing embodiments, the bleached state stabilizing element may be selected from the group consisting of Y, Ti, Zr, Hf, Nb, Ta, Mo, W, B, Al, Ga, In, Si, and combinations thereof. By way of further example, in each of the foregoing embodiments, the bleached state stabilizing element may be selected from the group consisting of Y, Ti, Zr, Hf, Nb, Ta, Mo, W, B, Al, Ga, In, and combinations thereof. By way of further example, in each of the foregoing embodiments, the bleached state stabilizing element may be selected from the group consisting of Y, Ti, Zr, Hf, Nb, Ta, Mo, W, and combinations thereof. By way of further example, in each of the foregoing embodiments, the bleached state stabilizing element may be selected from the group consisting of Ti, Zr, Hf, Nb, Ta, Mo, W, and combinations thereof. By way of further example, in each of the foregoing embodiments, the bleached state stabilizing element may be selected from the group consisting of Ti, Zr, Hf and combinations thereof. By way of further example, in each of the foregoing embodiments, the bleached state stabilizing element may be selected from the group consisting of Zr, Hf, and a combination thereof. By way of further example, in each of the foregoing embodiments, the bleached state stabilizing element may be selected from the group consisting of Nb, Ta, and a combination thereof. By way of further example, in each of the foregoing embodiments, the bleached state stabilizing element may be Ti. By way of further example, in each of the foregoing embodiments, the bleached state stabilizing element may be Zr. By way of further example, in each of the foregoing embodiments, the bleached state stabilizing element may be Hf. By way of further example, in each of the foregoing embodiments, the bleached state stabilizing element may be Nb. By way of further example, in each of the foregoing embodiments, the bleached state stabilizing element may be Ta. By way of further example, in each of the foregoing embodiments, the bleached state stabilizing element may be Mo. By way of further example, in each of the foregoing embodiments, the bleached state stabilizing element may be W. By way of further example, in each of the foregoing embodiments, the bleached state stabilizing element may be B. By way of further example, in each of the foregoing embodiments, the bleached state stabilizing element may be Al. By way of further example, in each of the foregoing embodiments, the bleached state stabilizing element may be Ga. By way of further example, in each of the foregoing embodiments, the bleached state stabilizing element may be In. By way of further example, in each of the foregoing embodiments, the bleached state stabilizing element may be Si. By way of further example, in each of the foregoing embodiments, the bleached state stabilizing element may be Ge. By way of further example, in each of the foregoing embodiments, the bleached state stabilizing element may be Sn. By way of further example, in each of the foregoing embodiments, the bleached state stabilizing element may be Sb. By way of further example, in each of the foregoing embodiments, the bleached state stabilizing element may be selected from the group consisting of Mo and W and a combination thereof. By way of further example, in each of the foregoing embodiments, the bleached state stabilizing element may be selected from the group consisting of Ti, Zr, Hf, Ta, Nb, W and combinations thereof.

The liquid mixture is prepared by combining, in a solvent system, a source of lithium, nickel, and at least one bleached state stabilizing element. In general, the source (starting) materials for each of the lithium, nickel and bleached state stabilizing element composition(s) comprised by the liquid mixture are soluble or dispersible in the liquid mixture solvent system and provide a source of metal(s) or metal oxide (s) for the lithium nickel oxide film. Additionally, at least one of lithium, nickel and bleached state stabilizing element source (starting) materials is a hydrolysable composition capable of polycondensation.

The lithium component of the liquid mixture may be derived from a range of soluble or dispersible lithium-containing source (starting) materials that chemically or thermally decompose to provide a source of lithium. For example, the source of lithium for the liquid mixture may comprise a lithium derivative of an organic compound (e.g., an organo-lithium compound) or a lithium salt of an organic or inorganic anion such as acetate, hydroxide, carbonate, nitrate, sulfate, peroxide, bicarbonate and the like. In certain embodiments, lithium acetate is sometimes preferred.

A wide variety of lithium derivatives of organic compounds are described in the literature and are useful as lithium sources for the liquid mixtures of this disclosure. They include lithium derivatives of alkanes (alkyl lithium compounds), aromatic compounds (aryl lithium compounds), olefins (vinyl or allyl lithium compounds), acetylenes (lithium acetylide compounds), alcohols (lithium alkoxide compounds), amines, (lithium amide compounds), thiols (lithium thiolate compounds), carboxylic acids (lithium carboxylate compounds) and β-diketones (β-diketonate compounds). Since the role of the lithium compound is to provide a soluble source of lithium ion in the lithium nickel oxide layer, the organic portion of the organo-lithium compound is removed during processing; it is preferred to utilize simple, low cost, and readily available organo-lithium compounds. It is further preferred that the organo-lithium compound be one that is not pyrophoric when exposed to air; this property limits but does not exclude the use of alkyl, aryl, vinyl, allyl, acetylide organo-lithium reagents as lithium sources in the liquid mixtures of this disclosure. In one embodiment, the source (starting) material for the lithium component of the liquid mixture is a lithium amide compound corresponding to the formula $LiNR^1R^2$ wherein $R^1$ and $R^2$ are hydrocarbyl, substituted hydrocarbyl, or silyl, and optionally, $R^1$ and $R^2$ and the nitrogen atom to which they are bonded may form a heterocycle.

In one embodiment, the source (starting) material for the lithium component of the liquid mixture is a lithium alkoxide corresponding to the formula LiOR wherein R is hydrocarbyl, substituted hydrocarbyl, or optionally substituted silyl. In one such embodiment, the source (starting) material for the lithium component of the liquid mixture is a lithium alkoxide corresponding to the formula LiOR wherein R is optionally substituted alkyl or aryl. For example, in one such embodiment, R is linear, branched or cyclic alkyl. By way of further example, in one such embodiment, R is 2-dimethylaminoethyl. By way of further example, in one such embodiment, R is 2-methoxyethyl. By way of further example, in one such embodiment, R is optionally substituted aryl. In another embodiment, the source (starting) material for the lithium component of the liquid mixture is a lithium carboxylate corresponding to the formula $LiOC(O)R^1$ wherein $R^1$ is hydrogen, hydrocarbyl, substituted hydrocarbyl, heterocyclo or optionally substituted silyl. For example, in one such embodiment $R^1$ is methyl (lithium acetate). By way of further example, in one such embodiment, $R^1$ is a linear or branched alkyl. By way of further example, in one such embodiment, $R^1$ is cyclic or polycyclic. By way of further example, in one such embodiment, $R^1$ is optionally substituted aryl.

In another embodiment, the source (starting) material for the lithium component of the liquid mixture is a lithium β-diketonate corresponding to the formula

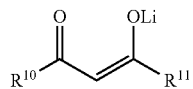

wherein $R^{10}$ and $R^{11}$ are independently hydrocarbyl, substituted hydrocarbyl, or optionally substituted silyl. For example, in one such embodiment, $R^{10}$ and $R^{11}$ are independently linear or branched alkyl. By way of further example, in one such embodiment, $R^{10}$ and $R^{11}$ are independently cyclic or polycyclic.

As previously noted, in one embodiment, the source (starting) material for the lithium component of the liquid mixture comprises hydrolysable lithium compositions. Hydrolysable lithium precursors are readily soluble in a variety of solvents including common organic solvents and react with atmospheric or intentionally added water liberating the anionic ligand in its protonated form (e.g., X—H). The ligand imparts solubility in organic solvents such as aliphatic and aromatic hydrocarbons, ethers, and alcohols and generally affects the reactivity of the lithium complex. Preferred hydrolysable lithium precursors are prepared using Li-complexes that are stabilized by substituted alkoxide ligands derived from alcohols of the following general formulae

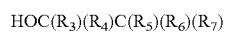

wherein $R_3$, $R_4$, $R_5$, $R_6$, and $R_7$ are independently substituted or unsubstituted hydrocarbyl groups, at least one of $R_3$, $R_4$, $R_5$, $R_6$, and $R_7$ comprises an electronegative heteroatom, and where any of $R_3$, $R_4$, $R_5$, $R_6$, and $R_7$ can be joined together to form a ring. The preferred electronegative heteroatoms are oxygen or nitrogen. Preferred alkoxide ligands [—OC($R_3$)($R_4$)C($R_5$)($R_6$)($R_7$)] are derived from alcohols in which one or more $R_5$, $R_6$, and $R_7$ is an ether or amine functional group. An exemplary alkoxide ligand is the one derived from 1-dimethylamino-2-propanol (DMAP): HOCH(Me)CH$_2$NMe$_2$.

In one embodiment, the source (starting) material for the lithium component of the liquid mixture comprises a lithium salt of an anion containing nickel or a bleached state-stabilizing element. For example, in one such embodiment, the source (starting) material for the lithium component of the liquid mixture comprises a lithium salt of an isopolyoxometallate or a heteropolyoxometalate. A heteropolyoxometalate is a metal oxide cluster that surrounds a central heteroatom ($[X_xM_mO_y]^{q-}$ where X is the heteroatom and M is commonly but not only W or Mo, e.g. $[PMo_{12}O_{40}]^{3-}$). An isopolyoxometalate is a metal oxide cluster that contains no central heteroatom ($[M_mO_y]^{q-}$ where M has been reported to be V, Nb, Ta, Cr, Mo, W and others, e.g. $[W_4O_{16}]^{8-}$). Alternatively, in one such embodiment, the source (starting) material for the lithium component of the liquid mixture comprises a lithium salt, or an adduct of a lithium salt such as an etherate of a lithium salt, of an anionic coordination complex of nickel and/or a bleached state stabilizing element. For example, in one such embodiment, the lithium salt is a lithium salt of a coordination complex corresponding to the formula $[M^4(OR^2)_4]^-$, $[M^5(OR^2)_5]^-$, $[M^6(OR^2)_6]^-$, or $[L_nNiX^1X^2X^3]^-$ where L is a neutral mono- or polydentate Lewis base ligand
$M^4$ is B, Al, Ga, or Y,
$M^5$ is Ti, Zr, or Hf,
$M^6$ is Nb or Ta,
n is the number of neutral ligands, L, that are coordinated to the Ni center, and
each $R^2$ is independently hydrocarbyl, substituted hydrocarbyl, or substituted or unsubstituted hydrocarbyl silyl,
$X^1$, $X^2$, and $X^3$ are independently an anionic organic or inorganic ligand. In one such embodiment, $X^1$, $X^2$, and $X^3$ are independently halide, alkoxide, diketonate, amide and any two L or X ligands can be joined tethered via a bridging moiety to form chelating ligands.

The nickel component of the liquid mixture may be derived from a range of soluble or dispersible nickel-containing source (starting) materials that chemically or thermally decompose to provide a source of nickel. For example, the source of nickel for the liquid mixture may comprise a nickel derivative of an organic compound (e.g., an organo-nickel compound) or a nickel salt of an organic or inorganic anion such as acetate, dienoate, hydroxide, carbonate, hydroxycarbonate, nitrate, sulfate, or hybrids comprising both organic and inorganic ligands. In certain embodiments, nickel acetate is sometimes preferred.

A wide variety of organo-nickel compounds are described in the literature and are useful as nickel sources for the liquid mixtures of this disclosure. In a preferred embodiment, the source material is dissolved in the liquid mixture to form a homogeneous solution that is filterable through a 0.2 micron filter. For example, in one embodiment the nickel source is a zero valent organo-nickel compound. Suitable zero valent organo-nickel compounds include bis(cyclooctadiene)Ni.

More commonly, organo-nickel compounds where the nickel center is in a formal oxidation state of 2+ (Ni(II)) are used as sources of nickel in the liquid mixtures of this disclosure. Exemplary Ni(II) complexes further include organic-ligand stabilized Ni(II) complexes corresponding to the formula $L_nNiX^4X^5$ wherein L is a neutral Lewis base ligand, n is the number of neutral Lewis ligands coordinated to the Ni center, and $X^4$ and $X^5$ are independently an organic or inorganic anionic ligand. For example, in one such embodiment, the nickel source corresponds to the formula $L_nNiX^4X^5$ wherein each L is independently a Lewis base ligand such as amine, pyridine, water, THF or phosphine and $X^4$ and $X^5$ are independently a hydride, alkyl, alkoxide, allyl, diketonate, amide or carboxylate ligand and any two L or X ligands can be joined via a bridging moiety to form a chelating ligand. Exemplary Ni(II) complexes include Ni(II) complexes such as bis(cyclopentadienyl)Ni(II) complexes, Ni(II) allyl complexes including mixed cyclopentadienylNi(II)allyl complexes, bis(aryl)Ni(II) complexes such as bis(mesityl)Ni(II), bis(acetate)Ni(II), bis(2-ethylhexanoate)Ni(II), bis(2,4-pentanedionato)Ni(II), and neutral Lewis base adducts thereof.

In one embodiment, the source (starting) material for the nickel component of the liquid mixture comprises hydrolysable nickel compositions. Hydrolysable nickel precursors are readily soluble in a variety of solvents including common organic solvents and react with atmospheric or intentionally added water to form $Ni(OH)_2$, and liberate the anionic ligand in its protonated form (e.g., X—H) The ligand imparts solubility in organic solvents such as aliphatic and aromatic hydrocarbons, ethers, and alcohols and generally affects the reactivity of the nickel complex. A key functional characteristic of the hydrolysable nickel precursor is to convert into a nickel hydroxide or oxide when exposed to water at low temperature (e.g., below 150° C.). Preferred hydrolysable nickel precursors are prepared using Ni-complexes that are stabilized by substituted alkoxide ligands derived from alcohols of the following general formulae:

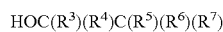

wherein $R^3$, $R^4$, $R^5$, $R^6$, and $R^7$ are independently substituted or unsubstituted hydrocarbyl groups, at least one of $R^3$, $R^4$, $R^5$, $R^6$, and $R^7$ comprises an electronegative heteroatom, and where any of $R^3$, $R^4$, $R^5$, $R^6$, and $R^7$ can be joined together to form a ring. The preferred electronegative heteroatoms are oxygen or nitrogen. Preferred alkoxide ligands [$^-OC(R^3)(R^4)C(R^5)(R^6)(R^7)$] are derived from alcohols in which one or more $R^5$, $R^6$, and $R^7$ is an ether or amine functional group. An exemplary alkoxide ligand is the one derived from 1-dimethylamino-2-propanol (DMAP): $HOCH(Me)CH_2NMe_2$. By way of further example, in one embodiment the nickel composition is a hydrolysable nickel composition corresponding to the formula:

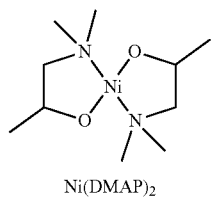

Ni(DMAP)$_2$

In one embodiment, the source (starting) material(s) for the bleached state stabilizing element(s) of the liquid mixture comprises a bleached state stabilizing element-containing composition that is soluble or dispersible in the liquid mixture and that chemically or thermally decomposes to provide a source of the bleached state stabilizing element(s) for the lithium nickel oxide film that is filterable through a 0.2 micron filter prior to the coating step. For example, in one embodiment the bleached state stabilizing element source is an organic-ligand stabilized metal complex or an organic or inorganic salt. For example, the salt may be a halide, nitrate, hydroxide, carbonate, or sulfate salt or an adduct thereof (e.g., acid, ether, amine or water adducts) including combinations. For example the salts of organic acids may include acetic, lactic, citric, or oxalic.

In one embodiment, the source (starting) material for the bleached state stabilizing element(s) of the liquid mixture comprises hydrolysable bleached state stabilizing element compositions. Hydrolysable bleached state stabilizing element precursors are readily soluble in a variety of solvents including common organic solvents and react with atmospheric or intentionally added water to form bleached state stabilizing element hydroxides and/or oxyhydroxides and/or oxides depending on the exact element, and liberate the anionic ligand in its protonated form (e.g., X—H). The ligand imparts solubility in organic solvents such as aliphatic and aromatic hydrocarbons, ethers, and alcohols and generally affects the reactivity of the complex. A key functional characteristic of the hydrolysable bleached state stabilizing element precursor is to convert into a bleached state stabilizing element hydroxide or oxide when exposed to water at low temperature (e.g., below 150° C.). Preferred hydrolysable bleached state stabilizing element precursors are prepared using bleached state stabilizing element-complexes that are stabilized by substituted alkoxide ligands derived from alcohols of the following general formulae:

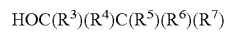

wherein $R^3$, $R^4$, $R^5$, $R^6$, and $R^7$ are independently substituted or unsubstituted hydrocarbyl groups, at least one of $R^3$, $R^4$, $R^5$, $R^6$, and $R^7$ comprises an electronegative heteroatom, and where any of $R^3$, $R^4$, $R^5$, $R^6$, and $R^7$ can be joined together to form a ring. The preferred electronegative heteroatoms are oxygen or nitrogen. Preferred alkoxide ligands [$^-OC(R^3)(R^4)C(R^5)(R^6)(R^7)$] are derived from alcohols in which one or more $R^5$, $R^6$, and $R^7$ is an ether or amine functional group.

An exemplary alkoxide ligand is the one derived from 1-dimethylamino-2-propanol (DMAP): HOCH(Me)CH$_2$NMe$_2$.

As previously noted, any of the aforementioned bleached state stabilizing element source materials may also contain nickel and/or lithium in addition to the bleached state stabilizing element(s).

In one embodiment, the bleached state stabilizing element(s) is/are selected from the group consisting of organic derivatives of Y, Ti, Zr, Hf, V, Nb, Ta, Mo, W, B, Al, Ga, In, Si, Ge, Sn, Sb and combinations thereof. As previously mentioned, a wide variety of organic-ligand stabilized derivatives of these elements are known in the literature and useful as components of the liquid mixtures of this disclosure. These include, preferably, complexes where the stabilizing organic ligands are alkoxides, carboxylates, diketonates, and amides. For metals having higher oxidations states such as the Group VI metals, oxo-derivatives comprising anionic organic ligands such as alkoxides are possible including the (RO)$_4$MO, and (RO)$_2$MO$_2$ where M is Mo or W, O is oxygen, and R is a hydrocarbyl, substituted hydrocarbyl, or hydrocarbyl or substituted hydrocarbyl silyl group. By way of further example, in one such embodiment, the liquid mixture comprises at least one bleached state stabilizing element(s) selected from the group consisting of Y, Ti, Zr, Hf, V, Nb, Ta, Mo, W, B, Al, Ga, In, Si, Ge, Sn, Sb and combinations thereof. By way of further example, when the liquid mixture comprises tungsten, tungsten (oxo) tetra(isopropoxide) and ammonium metatungstate can be used with ammonium metatungstate being preferred in certain embodiments. When the liquid mixture comprises titanium, ammonium titanium lactate is preferred in certain embodiments. When the liquid mixture comprises zirconium, zirconyl nitrate and zirconium acetate hydroxide may be used in certain embodiments with zirconyl nitrate being sometimes preferred. When the liquid mixture comprises niobium, ammonium niobate oxalate or niobium peroxo complexes may be used with peroxo complexes being sometimes preferred.

The solvent system may comprise a single solvent or a mixture of solvents in which source materials of the lithium, nickel and bleached state stabilizing element(s) are dissolved or dispersed. In one embodiment, the solvent system comprises a protic organic solvent such as alcohols, carboxylic acids and mixtures thereof. Exemplary protic organic solvents include methanol, ethanol, 2,2,2-trifluouroethanol, 1-propanol, 2-propanol, 1-butanol, 1-pentanol, 1-hexanol, 1-heptanol, and 2-ethoxyethanol; stearic acid, oleic acid, oleamine, and octadecylamine and the like, and mixtures thereof. In another embodiment, the solvent system comprises a polar or nonpolar aprotic solvent. For example, in one such embodiment the solvent system may comprise an alkane, and olefin, an aromatic, an ester or an ether solvent or a combination thereof. Exemplary non-polar aprotic solvents include hexane, octane, 1-octadecene, benzene, toluene, xylene, and the like. Exemplary polar aprotic solvents include, for example, N,N-dimethylformamide; 1,3-dimethyl-2-imidazolidinone; N-methyl-2-pyrrolidinone; acetonitrile; dimethylsulfoxide; acetone; ethyl acetate; benzyl ether, trioctylphosphine, and trioctylphosphine oxide, and the like, and mixtures thereof. Exemplary ethereal solvents include, for example, diethyl ether, 1,2-dimethoxyethane, methyl-tert-butyl ether, tetrahydrofuran, 1,4-dioxane, and the like, and mixtures thereof.

The liquid mixture may be formed by introducing the lithium, nickel and bleached state stabilizing element source materials into the solvent system at a temperature typically in the range of about 15° C. to 350° C. Depending upon their chemical composition and stability, the lithium, nickel and bleached state stabilizing element source materials may be dissolved or dispersed in the solvent system under an inert atmosphere. In certain other embodiments, however, the lithium, nickel and bleached state stabilizing element source materials may be dissolved or dispersed in the solvent system in air or a synthetic air (N$_2$/O$_2$) ambient. Independent of ambient, the sequence in which the lithium, nickel and bleached state stabilizing element source material(s) are introduced to the solvent system to form the liquid mixture may be varied to optimize performance. Thus, for example, in certain embodiments they may be combined with each other, or the solvent system in any sequence. By way of further example, in one embodiment, the lithium, nickel and bleached state stabilizing element source materials for the liquid mixture are three separate, chemically distinct materials. In another embodiment, at least one of the source (starting) materials constitutes a source of a combination of at least two of lithium, nickel, and bleached state stabilizing element(s), e.g., (i) lithium and nickel, (ii) lithium and bleached state stabilizing element(s), (iii) nickel and bleached state stabilizing element(s), (iv) at least two bleached state stabilizing elements or (v) lithium, nickel and at least one bleached state stabilizing element.

The solvent system and/or the lithium, nickel and bleached state stabilizing element source materials for the liquid mixture may also contain a range of additives. For example, the liquid mixture may contain solubility enhancers and complexing agents that stabilize the liquid mixture thermally and hydrolytically, such as organic acids, organic carbonates, and amines and polyethers. Particularly in regard to hydrolysis, the addition to and partial substitution of alkoxides by nucleophilic reagents comprising glycols, organic acids and diketonates is known to reduce the degree and rates of hydrolysis. When working in multi-metal liquid mixtures where varying rates of hydrolysis would be problematic to compositional uniformity, the judicious adjustment of both the degree and the rates of hydrolysis is known to be important. Furthermore, since the degree and rates of hydrolysis are known to be important and adjustable, in certain embodiments, it is sometimes preferred to initiate partial hydrolysis intentionally through the addition of water and/or acidic or basic catalysts to enhance the hydrolytic reactions. In one embodiment, an optimization of hydrolytic control reagents is coupled with pre-hydrolysis through the intentional addition of water. In another embodiment, the addition of hydrolytic control reagents is optimized for each component of the liquid mixture, individually. In another embodiment, pre-hydrolysis is optimized for each component of the liquid mixture individually. In a further embodiment, an optimization of hydrolytic control reagents and pre-hydrolysis is performed for each component of the liquid mixture, individually. As noted above, in certain embodiments, the source materials may be combined with each other or the solvent system in any sequence. In such embodiments, those of skill in the art should appreciate that the optimization of hydrolytic control reagents could be impacted by both the sequence of additions and/or the exact solvent systems. Likewise, pre-hydrolysis could also be impacted by both the sequence of additions and/or exact solvent systems. Thus it should be understood that regardless of the sequence of additions or exact solvent system that the hydrolytic control reagents and/or pre-hydrolysis are to be optimized. The liquid mixture may also contain wetting agents such as propylene glycol for enhancing the quality of the layers derived from the liquid mixture. In general, simple variation of lithium, nickel, and bleached state stabilizing element components in a solvent system will produce homogeneous solutions that can be filtered through a 0.2 micron filter without substantial loss of mass or change in the lithium, nickel, and bleached state stabilizing element composition.

In some embodiments, the formation of stable solutions of lithium, nickel and bleached state stabilizing element(s) may be aided by the use of acids and/or other complexing agents to minimize or even avoid precipitation when the various lithium, nickel and bleached state stabilizing element precursors are combined. The addition of these additives may sometimes also be viewed as stabilizing in regard to hydrolysis, as noted previously. Common inorganic acids such as hydrochloric, sulfuric and nitric acid and organic acids such as acetic, propionic, ethoxyacetic, lactic, 2-(2-methoxyethoxy)acetic, acrylic, citric, 2-ethylhexanoic and glyoxylic acid may be used for this purpose. Preferred acids include organic acids such as ethoxyacetic and 2-(2-methoxyethoxy) acetic acid. One of skill in the art will appreciate that certain organic acids will both lower the pH of the liquid mixture and minimize precipitation and that simple variation of the choice and concentration of organic acid will sometimes lead to acceptable (stable, precipitate-free solutions) and will sometimes lead to non-acceptable (substantial precipitation) liquid mixtures. For example, when glyoxylic acid is used to lower the pH of the solution, a precipitate is often formed upon combination with one or more of the liquid mixture precursors. In some cases the pH is adjusted to promote the dissolution of all the metal precursors in the mixture by the addition of base such as ammonium hydroxide. The pH is preferably not adjusted above the pH at which any of the components precipitate from the solution.

In some embodiments, the addition of wetting agent additives is often preferred for improving the film quality of the lithium mixed-metal nickel oxide material. Classes of additives include polymers such as polyethers or polyols (e.g., polyethylene glycol), alcohols such as ethanol or butanol, esters such as ethyl acetate, amino alcohols such as N,N-diethylamino ethanol, mixed alcohol ethers such as 2-ethoxyethanol, glycols such as propylene glycol with propylene glycol propyl ether and propylene glycol monomethyl ether acetate sometimes being selected.

A polar organic solvent such as an alcohol, an ether solvent system, or a non-polar organic solvent such as toluene, hexane may be used. When a polar solvent is used, the use of organometallic complexes of lithium, nickel and other metal precursors is generally preferred. Exemplary lithium, nickel and other metal precursors include hydrolysable complexes such as alkoxides, aminoalkoxides, diolates, or amides that readily react to water, converting to hydroxides. Exemplary lithium and nickel precursors include their (N,N-dimethylamino-isopropoxide) complexes. Exemplary Group 4, Group 5, Group 6 and other bleached state element precursors include alkoxides, such as ethoxides, isopropoxides, butoxides, oxyalkoxides, or chloroalkoxides that are compatibly soluble with lithium and nickel precursors preferably with no precipitation. One exemplary method for forming liquid mixtures in a polar organic solvent, such as an alcohol solvent, comprises combining alkoxide complexes of lithium, bleached state metal(s), and nickel between 15° C. and 80° C. in an inert atmosphere.

When hydrolysable metal precursors are used, the coating solutions are readily reactive to moisture in air or to intentionally added water, resulting in precipitation of their metal hydroxides, oxide or carbonates. Therefore, addition of polar organic solvents that can moderate hydrolysis is sometimes a preferred method for stabilizing these solutions. Classes of additives include chelating alcohols or amino alcohols such as 2-methoxyethanols, dimethylaminoethanol, or propyl amino ethanols, glycols such as propylene glycol, or ethylene glycol, low-pKa solvents such as hexafluoropropanol with propylene glycol or propylene carbonate are sometimes preferred.

In general, in those embodiments in which the liquid mixture comprises hydrolysable metal precursors (e.g., hydrolysable lithium source materials, hydrolysable nickel source materials, or hydrolysable bleached state stabilizing elements, or a combination thereof), the liquid mixture coating solutions are readily reactive to moisture in air or to intentionally added water. Thus, a dispersed phase containing lithium, nickel, and/or bleached state stabilizing element) may be formed by introducing water to the liquid mixture. The introduction may be achieved by adding water to the liquid mixture or generating water, in situ, in the liquid mixture by the addition of an agent that liberates water. For example, acid or base catalysts have an impact. Specifically, acids can protonate alkoxide groups producing good leaving groups and generating water as shown in the reaction below:

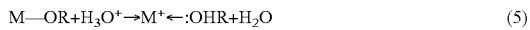

$$M\text{—}OR + H_3O^+ \rightarrow M^+ \leftarrow :OHR + H_2O \qquad (5)$$

Such a reaction can also impact the resulting morphology of the colloid product. As a further example, in one embodiment, at least about 0.05 equivalents of water are introduced (e.g., added or generated in situ) to the liquid mixture per equivalent of hydrolysable metal. By way of further example, in one embodiment at least about 0.1 equivalents of water are introduced to the liquid mixture per equivalent of hydrolysable metal. By way of further example, in one embodiment at least about 0.2 equivalents of water are introduced to the liquid mixture per equivalent of hydrolysable metal. By way of further example, in one embodiment at least about 0.3 equivalents of water are introduced to the liquid mixture per equivalent of hydrolysable metal. By way of further example, in one embodiment at least about 0.4 equivalents of water are introduced to the liquid mixture per equivalent of hydrolysable metal. By way of further example, in one embodiment at least about 0.5 equivalents of water are introduced to the liquid mixture per equivalent of hydrolysable metal. By way of further example, in one embodiment at least about 0.6 equivalents of water are introduced to the liquid mixture per equivalent of hydrolysable metal. By way of further example, in one embodiment at least about 0.7 equivalents of water are introduced to the liquid mixture per equivalent of hydrolysable metal. By way of further example, in one embodiment at least about 0.8 equivalents of water are introduced to the liquid mixture per equivalent of hydrolysable metal. By way of further example, in one embodiment at least about 0.9 equivalents of water are introduced to the liquid mixture per equivalent of hydrolysable metal. By way of further example, in one embodiment at least about 1 equivalent of water is introduced to the liquid mixture per equivalent of hydrolysable metal. In general, however, in such embodiments less than about 3 equivalents of water will typically be introduced to the liquid mixture per equivalent of hydrolysable metal. For example, in one such embodiment no more than at least about 2.5 equivalents of water are introduced to the liquid mixture per equivalent of hydrolysable metal. By way of further example, in one embodiment no more than about 2.25 equivalents of water are introduced to the liquid mixture per equivalent of hydrolysable metal. By way of further example, in one embodiment no more than about 2 equivalents of water are introduced to the liquid mixture per equivalent of hydrolysable metal. By way of further example, in one embodiment no more than about 1.75 equivalents of water are introduced to the liquid mixture per equivalent of hydrolysable metal. By way of further example, in one embodiment no more than about 1.5 equivalents of water are introduced to the liquid mixture per equivalent of hydrolysable metal. Exemplary ranges of water introduced to the liquid mixture per equivalent of hydrolysable metal thus include 0.1-2.25, 0.25-2, and 0.5-1.5 equivalents of water per equivalent of hydrolysable metal. As noted, instead of adding (exogenous) water to the system, water may be introduced by in situ generation of water. It is understood by one of skill in the art that the ranges described above comprise the sum of exogenous and in situ generated water.

Furthermore, in those embodiments in which the liquid mixture comprises hydrolysable metal precursors (e.g., hydrolysable lithium source materials, hydrolysable nickel source materials, or hydrolysable bleached state stabilizing elements, or a combination thereof), the use of hydrolytic control agents, as described above, for example chelating agents, may be important to control the rate and degree of hydrolysis, particularly if a goal of controlled partial hydrolysis is to be realized. Thus, if a dispersed phase containing lithium, nickel, and/or bleached state stabilizing element is to be formed by introducing water to the liquid mixture, the coordination sphere of the hydrolysable metal precursors may be adapted through the use of chelating agents such as nucleophilic reagents comprising glycols, organic acids and diketonates. If the chelating agents are overused however hydrolysis rates may be so attenuated as to prevent the desired degree of partial hydrolysis. For example, in one embodiment, at least about 0.05 equivalents of complexing agent are introduced to the liquid mixture per equivalent of hydrolysable metal. By way of further example, in one embodiment at least about 0.1 equivalents of complexing agent are introduced to the liquid mixture per equivalent of hydrolysable metal. By way of further example, in one embodiment at least about 0.2 equivalents of complexing agent are introduced to the liquid mixture per equivalent of hydrolysable metal. By way of further example, in one embodiment at least about 0.3 equivalents of complexing agent are introduced to the liquid mixture per equivalent of hydrolysable metal. By way of further example, in one embodiment at least about 0.4 equivalents of complexing agent are introduced to the liquid mixture per equivalent of hydrolysable metal. By way of further example, in one embodiment at least about 0.5 equivalents of complexing agent are introduced to the liquid mixture per equivalent of hydrolysable metal. By way of further example, in one embodiment at least about 0.6 equivalents of complexing agent are introduced to the liquid mixture per equivalent of hydrolysable metal. By way of further example, in one embodiment at least about 0.7 equivalents of complexing agent are introduced to the liquid mixture per equivalent of hydrolysable metal. By way of further example, in one embodiment at least about 0.8 equivalents of complexing agent are introduced to the liquid mixture per equivalent of hydrolysable metal. By way of further example, in one embodiment at least about 0.9 equivalents of complexing agent are introduced to the liquid mixture per equivalent of hydrolysable metal. By way of further example, in one embodiment at least about 1 equivalent of complexing agent is introduced to the liquid per equivalent of hydrolysable metal. By way of further example, in one embodiment at least about 1.25 equivalents of complexing agent is introduced to the liquid per equivalent of hydrolysable metal. By way of further example, in one embodiment at least about 1.5 equivalents of complexing agent is introduced to the liquid per equivalent of hydrolysable metal. In general, however, in such embodiments less than about 3 equivalents of complexing agent will typically be introduced to the liquid mixture per equivalent of hydrolysable metal. For example, in one such embodiment no more than at least about 2.75 equivalents of complexing agent are introduced to the liquid mixture per equivalent of hydrolysable metal. For example, in one such embodiment no more than at least about 2.5 equivalents of complexing agent are introduced to the liquid mixture per equivalent of hydrolysable metal. By way of further example, in one embodiment no more than about 2.25 equivalents of complexing agent are introduced to the liquid mixture per equivalent of hydrolysable metal. By way of further example, in one embodiment no more than about 2 equivalents of complexing agent are introduced to the liquid mixture per equivalent of hydrolysable metal. By way of further example, in one embodiment no more than about 1.75 equivalents of complexing agent are introduced to the liquid mixture per equivalent of hydrolysable metal. Exemplary ranges of complexing agent introduced to the liquid mixture per equivalent of hydrolysable metal thus include 0.25-2.75, 0.5-2.5, and 0.75-2.25 equivalents of complexing agent per equivalent of hydrolysable metal. In each of the embodiments recited in this paragraph, the complexing agent may be, for example, a coordinating acid such as ethoxyacetic acid.

Anodic Electrochromic Layer Preparation

In accordance with one aspect of the present disclosure, anodic electrochromic layers may be prepared from the liquid mixtures in a series of steps. In general, a film is formed from the liquid mixture on a substrate, solvent is evaporated from the liquid mixture, and the film is treated to form the anodic electrochromic layer. In one such embodiment, the film is thermally treated to form the anodic electrochromic layer.

In one embodiment, the process comprises a solution-based synthesis of electrochromic lithiated nickel oxide thin films where the organometallic metal precursors in an organic solvent are partially hydrolyzed with water in the presence of acid prior to deposition onto a substrate. Reproducible electrochemical performance is thus enabled by improving the stability of the coating solutions against moisture and $CO_2$. This disclosure also provides substantial reduction in cracking of the calcined films In one exemplary embodiment, a method of the present disclosure involves preparing a metal precursor solution that includes hydrolysable organometallic Li and Ni complexes and/or a stabilizing metal dopant in an organic solvent, modifying those complexes with an appropriate amount of an organic acid and partially hydrolyzing the solution through the addition of controlled amounts of water. The rate and the degree of hydrolysis of these multi metal-precursors are controlled by adjusting the equivalencies of water and acid relative to their alkoxide ligands. The resulting solutions are suitable for coating by a variety of methods such as spin coating, slot-die coating, or spray coating. The pre-hydrolyzed formulations don't require complex post-coating humidity treatments, thus reducing processing time and energy.

Advantageously, pre-hydrolyzed solutions are less reactive to the coating and drying environment, which is ambient air. The coordination of chelating organic acids to the metals efficiently protects the system from reaction with water and/or carbon dioxide such that the composition of the wet-deposition is maintained without converting to carbonates during the drying procedure. Thus the coating quality and the EC performance of the calcined materials are demonstrably more reproducible.

Another advantage of a synthesis method in accordance with one embodiment of the present disclosure is that it can provide homogeneous and stable solutions containing multiple metals that inherently have different rates and degrees of hydrolysis that can cause precipitation upon mixing. Especially, this disclosure provides various ways of controlled pre-hydrolysis for primary-, binary, or ternary-metal solutions to afford homogenous and stable coating solutions for high-performing lithium nickel metal oxide electrochromic materials.

Also, the pre-hydrolysis process replaces alkoxides with hydroxides/oxides liberating free alcohols prior to coating. Therefore, the process avoids a significant mass change on the substrate during coating, drying and calcination steps, which produces substantially less cracked films without requiring the addition of anti-cracking additives.

In one embodiment, the liquid mixture may be deposited onto any substrate having suitable optical, electrical, thermal, and mechanical properties. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protective coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass.

In one embodiment, the substrate comprises a transparent conductive layer (as described in connection with FIG. 1) on glass, plastic, metal, and metal coated glass or plastic. In this embodiment, the liquid mixture may be deposited directly onto the surface of the transparent conductive layer. In one embodiment, the transparent conductive layer is a transparent conductive oxide layer such as fluorinated tin oxide ("FTO").

In another embodiment, the substrate comprises a current modulating layer (as described in connection with FIG. 2) on glass, plastic, metal, and metal coated glass or plastic. In this embodiment, the liquid mixture may be deposited directly onto the surface of the current modulating layer.

In another embodiment, the substrate comprises an ion conductor layer (as described in connection with FIG. 1) on glass, plastic, metal, and metal coated glass or plastic. In this embodiment, the liquid mixture may be deposited directly onto the surface of the ion conductor layer.

A range of techniques may be used to form a layer that is derived from the liquid mixture on the substrate. In one exemplary embodiment, a continuous liquid layer of the liquid mixture is applied to the substrate by meniscus coating, roll coating, dip coating, spin coating, screen printing, spray coating, ink jet coating, knife over roll coating (gap coating), metering rod coating, curtain coating, air knife coating, and partial immersion coating and like, and solvent is then removed. Alternatively, the layer may be formed by directing droplets of the liquid mixture toward the substrate by spray or ink jet coating, and removing solvent. Regardless of technique, a layer is formed on the substrate containing lithium, nickel and at least one bleached state stabilizing element in the ratios previously described herein in connection with the electrochromic anodic layers. That is, the relative amounts of lithium, nickel and the bleached state stabilizing elements in the layer are controlled such that an atomic ratio of lithium to the combined amount of nickel and bleached state stabilizing element(s) and the atomic ratio of the combined amount of all bleached state stabilizing element(s) to nickel is as previously described in connection with the liquid mixture.

In those embodiments in which the lithium composition, nickel composition and/or bleached state stabilizing element composition(s) are hydrolysable, it may be desirable to form the layer on the substrate in a controlled atmosphere. For example, in one embodiment, deposition of the liquid mixture occurs in an atmosphere having a relative humidity (RH) of less than 55% RH. By way of further example, in one such embodiment, deposition of the liquid mixture occurs in an atmosphere having a relative humidity not in excess of 40% RH. By way of further example, in one such embodiment, deposition of the liquid mixture occurs in an atmosphere having a relative humidity not in excess of 30% RH. By way of further example, in one such embodiment, deposition of the liquid mixture occurs in an atmosphere having a relative humidity not in excess of 20% RH. By way of further example, in one such embodiment, deposition of the liquid mixture occurs in an atmosphere having a relative humidity not in excess of 10% RH or even not in excess of 5% RH. In some embodiments, the atmosphere may be even drier; for example, in some embodiments, deposition may occur in a dry atmosphere defined by a RH of less than 5% RH, less than 1% RH, or even less than 10 ppm water. In some embodiments, however, the control of relative humidity may be less important if appropriate amounts of water are added in an appropriate manner directly to the liquid mixture, for example if added to induce partial hydrolysis.

The deposition of the liquid mixture onto the substrate may be carried out in a range of atmospheres. In one embodiment, the liquid mixture is deposited in an inert atmosphere (e.g., nitrogen or argon) atmosphere. In an alternative embodiment, the liquid mixture is deposited in an oxygen-containing atmosphere such as compressed dry air or synthetic air (consisting of a mixture of oxygen and nitrogen in approximately 20:80 v/v ratio). In certain embodiments, for example, when the liquid mixture comprises a hydrolysable precursor for the lithium, nickel, and/or bleached state stabilizing element(s), performance may be improved by minimizing the liquid mixture's and the deposited film's exposure to $CO_2$; For example, in some embodiments the ambient may have a $CO_2$ concentration of less than 50 ppm, less than 5 ppm or even less than 1 ppm. In some embodiments, however, the control of an oxygen-containing atmosphere and/or the control of $CO_2$ concentration may be less important to performance.

The temperature at which the liquid mixture is deposited onto the substrate may range from near room temperature to elevated temperatures. For spray coating, for example, the maximum high temperature would be limited by the substrate stability (e.g., 550 to 700° C. for glass, less than 250° C. for most plastics, etc.) and the desired annealing temperature for the layer. For coating techniques in which a continuous liquid film is applied to a substrate, for example, coating temperatures will typically be in range of room temperature 25° C. to about 80° C.

After the substrate is coated with the liquid mixture, the resulting films may be placed under an air stream, vacuum, or heated to achieve further drying in order to remove residual solvent. The composition of the ambient atmosphere for this step may be controlled as previously described in connection with the coating step. For example, the atmosphere may have a relative humidity of less than 1% to 55% RH, it may be an inert atmosphere (nitrogen or argon), or it may contain oxygen.

In those embodiments in which the liquid mixture contains a hydrolysable precursor for the lithium, nickel, or bleached state stabilizing element, the coated substrate may then be exposed to a humid atmosphere (e.g., a RH of at least 30% RH) to hydrolyze the metal complex(es) to form a protonated ligand bi-product and a lithium nickel hydroxide film. Such exposure may be carried out, for example, at a temperature in the range about 40° C. to about 200° C. for a period of about 5 minutes to about 4 hours. In some embodiments, a second thermal processing step at temperatures above 200° C., preferably above 250° C., to form an oxide film having substantially lower levels of hydroxide content. In some embodiments, however, exposure of the coated substrate to a humid atmosphere may be less important if appropriate amounts of water are added in an appropriate manner directly to the liquid mixture.

In one embodiment, the coated substrate is heat-treated (annealed) to form the anodic electrochromic layer. Depending upon the composition of the liquid mixture and the substrate stability, the coated substrate is annealed at a temperature of at least about 200° C. For example, in one embodiment the substrate may be annealed at a temperature at the lower end of this range, e.g., at least about 250° C. but less than about 700° C.; temperatures within this range would be particularly advantageous for polymeric substrates that may lose dimensional stability at greater temperatures. In other embodiments, the coated substrate may be annealed at a temperature in the range about 300° C. to about 650° C. By way of further example, in one such embodiment the coated substrate may be annealed at a temperature in the range of about 350° C. to about 500° C. In general, however, annealing temperatures will typically not exceed about 750° C. The anneal time may range from several minutes (e.g., about 5 minutes) to several hours. Typically, the anneal time will range from about 30 minutes to about 2 hours. Additionally, the annealing temperature may be achieved (i.e., the ramp rate from room temperature to the annealing temperature) over a period ranging from 1 minute to about several hours.

In some embodiments it may be desirable to heat-treat the coated substrate in a controlled atmosphere. For example, in one embodiment, the coated substrate is annealed in an atmosphere having a relative humidity (RH) of about 5% to 55% RH. By way of further example, in one such embodiment, the coated substrate is annealed in an atmosphere having a relative humidity not in excess of 10% RH or even not in excess of 5% RH. In some embodiments, the atmosphere may be even drier; for example, in some embodiments, the coated substrate is annealed in a dry atmosphere defined by a RH of less than 5% RH, less than 1% RH, or even less than 10 ppm water. In some embodiments, however, the control of the annealing atmosphere in terms of relative humidity may be less important.

In some embodiments, the composition of the carrier gas in which the heat-treatment is carried out may be an inert (e.g., nitrogen or argon) atmosphere. Alternatively, it may contain oxygen (e.g., compressed dry air or synthetic air consisting of a mixture of oxygen and nitrogen in approximately 20:80 v/v ratio) environment. In certain embodiments, performance may be improved by reducing the exposure to $CO_2$ using atmospheres in which the $CO_2$ concentration is less than 50 ppm. For example, in some embodiments the $CO_2$ concentration may be less than 5 ppm or even less than 1 ppm. In some embodiments, however, the control of an oxygen-containing atmosphere and/or the control of $CO_2$ concentration may be less important to performance.

The coated substrate may be heat-treated (annealed) by various means. In one embodiment, the coated substrate is heat-treated (annealed) in a rapid thermal annealer in which heating occurs primarily through absorption of radiative energy by the layer and/or the substrate. In another embodiment, the coated substrate is heat-treated (annealed) in a belt furnace in which heating occurs in one or more zones in a continuous process. In another embodiment, the coated substrate is heat-treated (annealed) in a convection oven and furnaces in which heating is achieved in a batch process by a combination of radiative and conductive processes. In another embodiment, the coated substrate is heat-treated (annealed) using a hot plate (bake plate) or surface heating where heating occurs primarily by conduction by placing the substrate on or slightly above a heated surface; examples include proximity baking where the sample is held above a plate using a cushion of air, hard contact baking where the substrate is held to the surface of a heated surface via vacuum or some other method, and soft contact baking where the substrate rests on a heated surface via gravity alone.

In some embodiments, the resulting anodic electrochromic layer has an average thickness between about 25 nm and about 2,000 nm. For example, in one such embodiment the anodic electrochromic layer has a thickness of about 50 nm to about 2,000 nm. By way of further example, in one such embodiment the anodic electrochromic layer has a thickness of about 25 nm to about 1,000 nm. By way of further example, in one such embodiment, the anodic electrochromic layer has an average thickness between about 100 nm and about 700 nm. In some embodiments, the anodic electrochromic layer has a thickness of about 250 nm to about 500 nm.

Depending upon the method of deposition and the solvent system comprised by the liquid mixture, the resulting electrochromic nickel oxide layer may comprise a significant amount of carbon. For example, in one embodiment, the anodic electrochromic layer contains at least about 0.01 wt % carbon. By way of further example, in one embodiment the electrochromic nickel oxide material contains at least about 0.05 wt % carbon. By way of further example, in one embodiment the anodic electrochromic material contains at least about 0.1 wt % carbon. By way of further example, in one embodiment the anodic electrochromic material contains at least about 0.25 wt % carbon. By way of further example, in one embodiment the anodic electrochromic material contains at least about 0.5 wt % carbon. Typically, however, the anodic electrochromic material will generally contain no more than about 5 wt % carbon. Thus, for example, in one embodiment, the anodic electrochromic material will contain less than 4 wt % carbon. By way of further example, in one embodiment the anodic electrochromic material will contain less than 3 wt % carbon. By way of further example, in one embodiment the anodic electrochromic material will contain less than 2 wt % carbon. By way of further example, in one embodiment the anodic electrochromic material will contain less than 1 wt % carbon. Thus, in certain embodiments, the anodic electrochromic material may contain 0.01 wt % to 5 wt % carbon. By way of further example, in certain embodiments, the anodic electrochromic material may contain 0.05 wt % to 2.5 wt % carbon. By way of further example, in certain embodiments, the anodic electrochromic material may contain 0.1 wt % to 2 wt % carbon. By way of further example, in certain embodiments, the anodic electrochromic material may contain 0.5 wt % to 1 wt % carbon.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1: Synthesis of $Li_1Ni_{0.67}Nb_{0.33}O_z$ from a Pre-Hydrolyzed Solution Prepared by Gelation with Water and then Re-Dissolution with Acid Hydrolysable Ni(II) precursor compound ($Ni(DMAP)_2$, DMAP=1-dimethylamino-2-propanolate) was synthesized by a modification of the known method (Hubert-Pfalzgraf et. al. Polyhedron, 16 (1997) 4197-4203). LiDMAP compound was synthesized by the reaction of n-butyl-lithium and DMAPrOH (1-dimethylamino-2-propanol).

In EtOH (1.1 mL), were dissolved LiDMAP (0.32 g), $Nb(OEt)_5$ (0.30 g) and $Ni(DMAP)_2$ (0.51 g) resulting in a 2.9 M solution (by total metal) under an $N_2$ atmosphere in the glove box. The solution then was taken out of the glove box, and to which was added dropwise a 10% water in ethanol solution (v/v, 1.46 mL) using a syringe under vigorous stirring. The solution became green, and turned to a gel under mild heating. Then the transparent green gel was digested by adding ethoxyacetic acid (0.496 mL) at 60° C. After being cooled down the solution was filtered through 0.2 μm filter, and was spun onto an FTO (fluorine-doped tin oxide) substrate at 1000 rpm for 20 sec under an $N_2$ atmosphere. Then the wet deposition was dried under Ar, and was heated at 400° C. under CDA with 40% relative humidity (RH) for an hour.

After cooling, the film was brought into an Ar-filled glove box, and the electrochromic properties were examined in a combined electrochemical/optical setup consisting of a three-electrode cell in a cuvette placed in the path of a white light source and spectrometer. Data were obtained by sequential oxidation and reduction under galvanostatic control followed by a constant voltage hold (CC-CV). The electrolyte was 1 M $LiClO_4$ in propylene carbonate. Typically a voltage range of 2.5-4.0 V vs Li/Li+ was applied. Separate pieces of lithium metal were used as the reference and counter electrodes. Optical data were recorded every 1-5 s. Coloration Efficiency (CE) was calculated from the transmission data (at 550 nm) and the amount of charge passed during the second reduction event over the applied voltage range.

Film thickness was measured by profilometry to be 246 nm, and the measured charge capacity was 14.5 $mC/cm_2$ over the applied voltage range. The films switched from a bleached state transmission of 85.9% to a dark state transmission of 21.2% (at 550 nm). Absolute CE was 26.4 $cm^2/C$.

Example 2: Synthesis of $Li_{1.0}Ni_{0.67}Nb_{0.33}O_z$ from a Pre-Hydrolyzed Solution with a Mixture of Water and Acid In 1-PnOH (1.301 g), were dissolved LiDMAP (0.474 g), $Nb(OEt)_5$ (0.472 g) and $Ni(DMAP)_2$ (0.793 g) resulting in a 3.0 M solution (by total metal) under an $N_2$ atmosphere in the glove box. The solution then was taken out of the glove box, and to 1.0 mL of the solution was added dropwise a water/ethoxyacetic acid/1-PnOH 20%/25%/55% solution (v/v, 0.431 mL) using a syringe under vigorous stirring. The solution became green, and was allowed to stir for 20 min at RT. Then the solution was filtered through 0.2 μm filter, and was spun onto an FTO substrate at 800 rpm for 30 sec under an $N_2$ atmosphere. Then the wet deposition was dried under Ar, and was heated at 400° C. under CDA (40% RH) for an hour.

After cooling, the film was brought into an Ar-filled glove box, and the electrochromic properties were examined as described in Example 1.

Film thickness was measured by profilometry to be 263 nm, and the measured charge capacity was 23 $mC/cm^2$ over the applied voltage range. The film switched from a bleached state transmission of 85% to a dark state transmission of 21% (at 550 nm). Absolute coloration efficiency was 27.4 $cm^2/C$.

Examples 3-8: Synthesis of $Li_{1.3}Ni_{0.67}M_{0.33}O_z$ (M=Ta, Ti, Zr, Hf, Sb, and V) from Pre-Hydrolyzed Solutions with a Mixture of Water and Acid The coating solution of each material was prepared with the same method as described in Example 2, by pre-hydrolyzing the Li, Ni and stabilizing metal precursor solutions with water and ethoxyacetic acid by adding a certain amount of a water/ethoxyacetic acid/1-PnOH 20%/25%/55% solution. All the metal solutions afforded green solutions with small differences in brightness. Metal precursor compounds of $Ti(iOPr)_4$, $Zr(nOBu)_4$, $Hf(nOBu)_4$, $Sb(nOBu)_3$, and $V(O)(iOPr)_3$ were used for producing Ti, Zr, Hf, Sb and V-doped LiNiOx, respectively. Coating, calcination, and electrochemical analysis were performed with the same processing parameters shown in Example 1. Electrochemical results with film thicknesses of the calcined films are listed in Table 2.

TABLE 2

Electrochromic data for the thin films of
$Li_{1.3}Ni_{0.67}M_{0.33}O_z$ (M = Ta, Ti, Zr, Hf, Sb, and V).

| No | Materials | Thickness (nm) | Charge capacity (mC/cm$^2$) | $T_{bleached}$ at 550 nm (%) | $T_{colored}$ at 550 nm (%) | Abs. of Coloration efficiency at 550 nm (cm$^2$/C) |
|---|---|---|---|---|---|---|
| 3 | $Li_{1.3}Ni_{0.67}Ta_{0.33}O_z$ | 187-277 | 4-18 | 75-89 | 26-48 | 23-33 |
| 4 | $Li_{1.3}Ni_{0.67}Ti_{0.33}O_z$ | | | | | |
| 5 | $Li_{1.3}Ni_{0.67}Hf_{0.33}O_z$ | | | | | |
| 6 | $Li_{1.3}Ni_{0.67}Zr_{0.33}O_z$ | | | | | |
| 7 | $Li_{1.3}Ni_{0.67}Sb_{0.33}O_z$ | | | | | |
| 8 | $Li_{1.3}Ni_{0.67}V_{0.33}O_z$ | | | | | |

Examples 9-13: Synthesis of $Li_{1.0}Ni_{0.67}M_{0.33}O_z$ where M=Nb from Pre-Hydrolyzed Primary- or Ternary-Metal Solutions Prepared by Various Mixing Orders of Water and Acid For the use of primary metal solutions, individual metal solutions of LiDMAP (2.0M), Ni(DMAP)$_2$ (2.0M), and Nb(OEt)$_5$ (2.0M) in ethanol were prepared in an N$_2$ atmosphere in a glovebox. Then the solutions were taken out of the box, and a 10% water mixture and ethoxyacetic acid were added in different orders to the solutions, maintaining a molar ratio of water to acid of 1 to 1, as described in the Table 3 below. The resulted solutions were then mixed to the molar ratio of Li:Ni:Nb=1.0:0.67:0.33.

For the use of ternary metal solutions, a solution containing LiDMAP, Ni(DMAP)$_2$ and Nb(OEt)$_5$ with a 1:0.67:0.33 molar ratio in 1-PnOH were prepared in an N$_2$ atmosphere in a glovebox. Then the solutions were taken out of the box, and a 10% water mixture and ethoxyacetic acid were added in different orders to the solutions, as described in the Table 3 below. Both cases afforded transparent green coating solutions.

The combined solutions from above were filtered through 0.2 μm filter, and were spun onto FTO substrates at 800 rpm for 30 sec under an N2 atmosphere. Then the wet depositions were dried under Ar, and were heated at 400° C. under CDA (40% RH) for an hour.

After cooling, the films were brought into an Ar-filled glove box, and the electrochromic properties were examined as described in Example 1. Electrochemical results with film thicknesses of the calcined films are listed in Table 3.

TABLE 3

Various mixing orders of water and acid to primary- or ternary-metal precursor solutions for $Li_{1.0}Ni_{0.67}M_{0.33}O_z$, where M = Nb, and the electrochromic data of the calcined films.

| No | Precursor solution | 1$^{st}$ addition reagent | 2$^{nd}$ addition reagent | Charge capacity (mC/cm$^2$) | Thickness (nm) | $T_{bleached}$ and $T_{colored}$ at 550 nm (%) | Abs. of Coloration efficiency at 550 nm (cm$^2$/C) |
|---|---|---|---|---|---|---|---|
| 9 | LiDMAP<br>NiDMAP2<br>Nb(OEt)5 | acid<br>acid<br>acid | 10% water<br>10% water<br>10% water | 10.7 | 168 | 87, 49 | 24.8 |
| 10 | LiDMAP<br>NiDMAP2<br>Nb(OEt)5 | 10% water<br>10% water<br>10% water | acid<br>acid<br>acid | 11.6 | 182 | 86, 43 | 26.4 |
| 11 | LiDMAP<br>NiDMAP2<br>Nb(OEt)5 | acid<br>acid<br>acid | Mixed them all and added 10% water (excess) | 17.2 | 103 | 84, 18 | 37.1 |
| 12 | LiDMAP/NiDMAP2/Nb(OEt)5 | 10% water | Acid | 16.1 | 229 | 89, 32 | 27.0 |
| 13 | LiDMAP/NiDMAP2/Nb(OEt)5 | acid | 10% water | 16.4 | 219 | 89, 33 | 26.2 |

Example 14: Synthesis of $Li_1Ni_{0.67}Nb_{0.33}O_z$ from Non-Hydrolysable Li and Ni Precursor Compounds To a dispersion of LiOH (0.23 g) in ethanol, was added ethoxyacetic acid (1.04 g) under stirring, affording a clear solution. In a separate vial, Ni(OAc)$_2$·4H$_2$O (1.24 g) and diethanolamine (1.29 g) were mixed in EtOH under stirring, and the solution became blue upon complete dissolution. To a 3 M Nb(OEt)$_5$ in 1-pentanol in a separate vial, was dropwise added ethoxyacetic acid (1.25 mL) under stirring, and then was added a mixture of water10%/ethanol18%/1-pentanol74% (0.9 mL). Then the Li, Ni, and Nb solutions were mixed up with the molar ratio of Li:Ni:Nb=4:2:1, which afforded a green solution. The solution was filtered through 0.2 μm filter, and was spun onto an FTO (fluorine-doped tin oxide) substrate at 1000 rpm for 20 sec under an N$_2$ atmosphere. Then the wet deposition was dried under Ar, and was heated at 400° C. under CDA with 40% relative humidity (RH) for an hour.

After cooling, the film was brought into an Ar-filled glove box, and the electrochromic properties were examined in the manner of Example 1.

Film thickness was measured by profilometry to be 183 nm, and the measured charge capacity was 8.9 mC/cm$_2$ over the applied voltage range. The film switched from a bleached state transmission of 89% to a dark state transmission of 49% (at 550 nm). Absolute CE was 28 cm$^2$/C.

What is claimed is:

1. A process for preparing a multi-layer electrochromic structure, the process comprising:
   depositing a film of a liquid mixture comprising lithium, nickel, and at least one bleached state stabilizing element onto a surface of a substrate, and treating the deposited film to form an anodic electrochromic layer comprising a lithiated nickel oxide, wherein
   (i) the atomic ratio of lithium to the combined amount of nickel and the bleached state stabilizing element in the anodic electrochromic layer is at least 0.4:1,
   (ii) the atomic ratio of the amount of the bleached state stabilizing element to the combined amount of nickel and the bleached state stabilizing elements in the anodic electrochromic layer is at least 0.025:1,
   (iii) the bleached state stabilizing element is selected from the group consisting of Y, Ti, Zr, Hf, V, Nb, Ta, Mo, W, B, Al, Ga, In, Si, Ge, Sn, P, Sb and combinations thereof, and
   (iv) the liquid mixture comprises a dispersed phase and a continuous phase, the dispersed phase comprising a dispersed species having a number average size of at least 5 nm.

2. The process of claim 1 wherein the dispersed species has a number average size selected from the group consisting of at least 10 nm, at least 25 nm, at least 50 nm, at least 75 nm, and at least 100 nm.

3. The process of claim 1 wherein the dispersed species comprises discrete particles.

4. The process of claim 1 wherein the substrate comprises a transparent conductive layer and a glass, plastic, metal, or metal-coated glass or plastic layer, and the surface of the substrate onto which the liquid mixture is deposited is a surface of the transparent conductive layer.

5. The process of claim 1 wherein the nickel component of the liquid mixture is derived from an organic-ligand stabilized Ni(II) complex corresponding to the formula L$_n$NiX$^4$X$^5$ wherein L is a neutral Lewis base ligand, n is the number of neutral Lewis ligands coordinated to the Ni center, and X$^4$ and X$^5$ are independently an organic or inorganic anionic ligand.

6. The process of claim 1 wherein the nickel component of the liquid mixture is a hydrolysable nickel composition derived from (i) nickel or a nickel-containing composition and (ii) an alcohol having the formula:

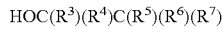

HOC(R$^3$)(R$^4$)C(R$^5$)(R$^6$)(R$^7$)

wherein R$^3$, R$^4$, R$^5$, R$^6$, and R$^7$ are independently substituted or unsubstituted hydrocarbyl groups, at least one of R$^3$, R$^4$, R$^5$, R$^6$, and R$^7$ comprises an electronegative heteroatom, and where any of R$^3$, R$^4$, R$^5$, R$^6$, and R$^7$ can be joined together to form a ring.

7. The process claim 1 wherein the atomic ratio of lithium to the combined amount of nickel and the bleached state stabilizing element in the liquid mixture is at least 0.4:1, the atomic ratio of the combined amount of the bleached state stabilizing element to the combined amount of nickel and the bleached state stabilizing elements in the liquid mixture is in the range of 0.025:1 to 0.8:1, and the bleached state stabilizing element in the liquid mixture is selected from the group consisting of Y, Ti, Zr, Hf, V, Nb, Ta, Mo, W, B, Al, Ga, In, Si, Ge, Sn, Sb and combinations thereof.

8. The process of claim 1 wherein the deposited material is thermally treated at an annealing temperature of at least 200° C. and for an annealing time of two hours to form the anodic electrochromic layer.

9. The process of claim 1 wherein the process further comprises
   combining a lithium source material, a nickel source material and at least one bleached state stabilizing element source material in a solvent system, at least one of the lithium, nickel and bleached state stabilizing element source materials being a hydrolysable source material, and
   hydrolyzing the hydrolysable source material to form the liquid mixture.

10. The process of claim 9 wherein the hydrolysable lithium source material is a metal alkoxide comprising lithium, nickel or the bleached state stabilizing element.

11. The process of claim 9 wherein the hydrolysable source material is hydrolyzed by adding water to the liquid mixture.

12. The process of claim 9 wherein the hydrolysis rate and degree of hydrolysis of the hydrolysable source material is attenuated by adding at least 0.05 equivalents of a complexing agent per equivalent of hydrolysable lithium, nickel and bleached state stabilizing element in the liquid mixture.

13. The process of claim 9 wherein the lithium source material is a lithium salt of a coordination complex corresponding to the formula [M$^4$(OR$^2$)$_4$]$^-$,[M$^5$(OR$^2$)$_5$]$^-$, [M$^6$(OR$^2$)$_6$]$^-$, or [L$_n$NiX$^1$X$^2$X$^3$]$^-$ wherein
   L is a neutral mono- or polydentate Lewis base ligand,
   M$^4$ is B, Al, Ga, or Y,
   M$^5$ is Ti, Zr, or Hf,
   M$^6$ is Nb or Ta,
   n is the number of neutral ligands, L, that are coordinated to Ni in the coordination complex,
   each R$^2$ is independently hydrocarbyl, substituted hydrocarbyl, or substituted or unsubstituted hydrocarbyl silyl, and
   X$^1$, X$^2$, and X$^3$ are independently an anionic organic or inorganic ligand.

14. The process of claim 9 wherein the hydrolysable source material is hydrolyzed by water generated in situ in the liquid mixture.

15. The process of claim 14 wherein water is generated in situ by the addition of an acid catalyst to the liquid mixture.

16. The process of claim 9 wherein the hydrolysis rate and degree of hydrolysis of the hydrolysable source material is attenuated by adding a complexing agent to the liquid mixture.

17. The process of claim 16 wherein the complexing agent is a coordinating acid.

18. The process of claim 17 wherein the coordinating acid is ethoxyacetic acid.

19. A process for forming a multi-layer electrochromic structure, the process comprising:
   depositing a film of a liquid mixture onto a surface of a substrate to form a deposited film, wherein the liquid mixture comprises a continuous phase and a dispersed phase, the dispersed phase comprising metal oxide particles, metal hydroxide particles, metal alkoxide particles, metal alkoxide oligomers, gels or particles, or a combination thereof having a number average size of at least 5 nm, and;

treating the deposited film to form an anodic electrochromic layer comprising a nickel oxide, the anodic electrochromic layer adapted to cycle between a bleached state transmissivity of at least 70% and a darkened state transmissivity of less than 30%.

20. The process of claim 19 wherein the anodic electrochromic layer is adapted to cycle between a bleached state transmissivity of at least 75% and said darkened state transmissivity.

21. The process of claim 19 wherein the dispersed phase comprises a species containing lithium, nickel and/or a bleached state stabilizing element.

22. The process of claim 21 wherein the bleached state stabilizing element is selected from the group consisting of Y, Ti, Zr, Hf, V, Nb, Ta, Mo, W, B, Al, Ga, In, Si, Ge, Sn, P, Sb and combinations thereof.

23. The process of claim 21 wherein the atomic ratio of lithium to the combined amount of nickel and the bleached state stabilizing element in the liquid mixture is at least 0.4:1.

24. The process of claim 21 wherein the atomic ratio of the combined amount of the bleached state stabilizing element to the combined amount of nickel and the bleached state stabilizing element in the liquid mixture is in the range of 0.025:1 to 0.8:1.

* * * * *